United States Patent
Atsumi

[19]

[11] Patent Number: 5,854,964
[45] Date of Patent: Dec. 29, 1998

[54] IMAGE READING APPARATUS HAVING AN AUTO DOCUMENT FEEDER

[75] Inventor: Tomoyuki Atsumi, Toyohashi, Japan

[73] Assignee: Minolta Co., Ltd., Osaka, Japan

[21] Appl. No.: 842,039

[22] Filed: Apr. 23, 1997

[30] Foreign Application Priority Data

Apr. 24, 1996 [JP] Japan .................................. 8-102142

[51] Int. Cl.$^6$ .................................................. G03G 15/00
[52] U.S. Cl. .......................... 399/371; 399/17; 399/372; 358/488
[58] Field of Search .......................... 399/17, 371, 372; 358/448, 488

[56] References Cited

U.S. PATENT DOCUMENTS

| | | | |
|---|---|---|---|
| 4,802,229 | 1/1989 | Yamada | 382/289 |
| 5,093,653 | 3/1992 | Ikehira | 358/488 X |
| 5,191,438 | 3/1993 | Katsuada et al. | 358/488 X |
| 5,373,371 | 12/1994 | Masui | 358/488 X |
| 5,528,387 | 6/1996 | Kelly et al. | 358/488 |
| 5,715,497 | 2/1998 | Ueda et al. | 399/51 X |
| 5,719,968 | 2/1998 | Hashimoto et al. | 358/488 X |

FOREIGN PATENT DOCUMENTS

| | | |
|---|---|---|
| 56-120264 | 9/1981 | Japan . |
| 4-271337 | 9/1992 | Japan . |
| 4-329755 | 11/1992 | Japan . |

*Primary Examiner*—Matthew S. Smith
*Attorney, Agent, or Firm*—Burns, Doane, Swecker & Mathis, LLP

[57] ABSTRACT

An auto document feeder (ADF) adjustment mode is set from an operation panel and a start key is pressed. An original is conveyed to an image reading unit by an original conveying apparatus, a scanner reads an original image and image data is generated. The image data is stored into image memory. By searching the image data stored in the image memory, two vertexes are detected. From the two vertexes, inclination to the standard original reading position is calculated, and also, dislocation in the main scan and subscan directions when the inclination is corrected is calculated. The inclination and the dislocation in the main scan direction are converted into real adjustment amounts and displayed on the operation panel. The dislocation in the subscan direction is sent to a CPU and then the CPU controls the original conveying apparatus so as to optimize the original-conveying distance.

32 Claims, 15 Drawing Sheets

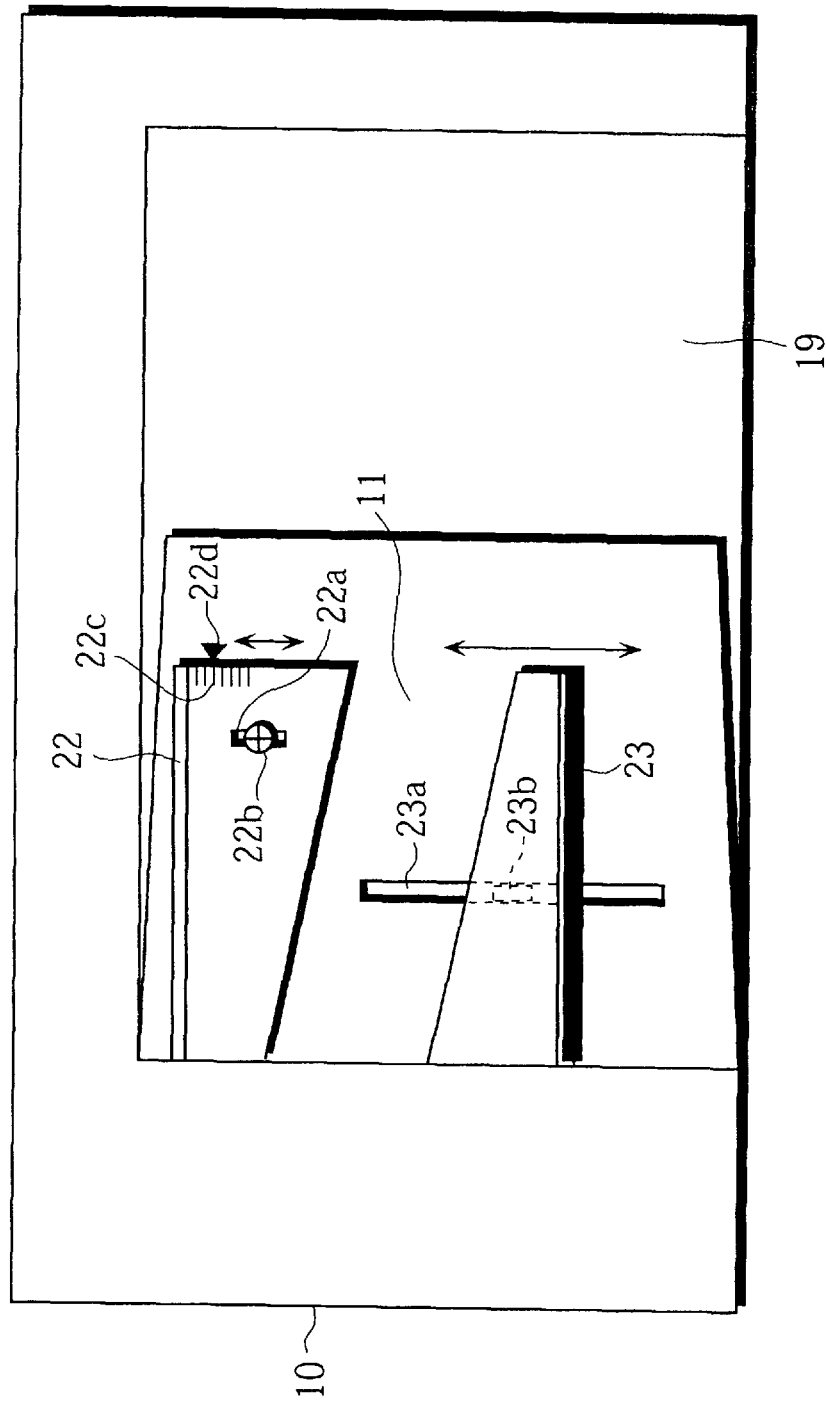

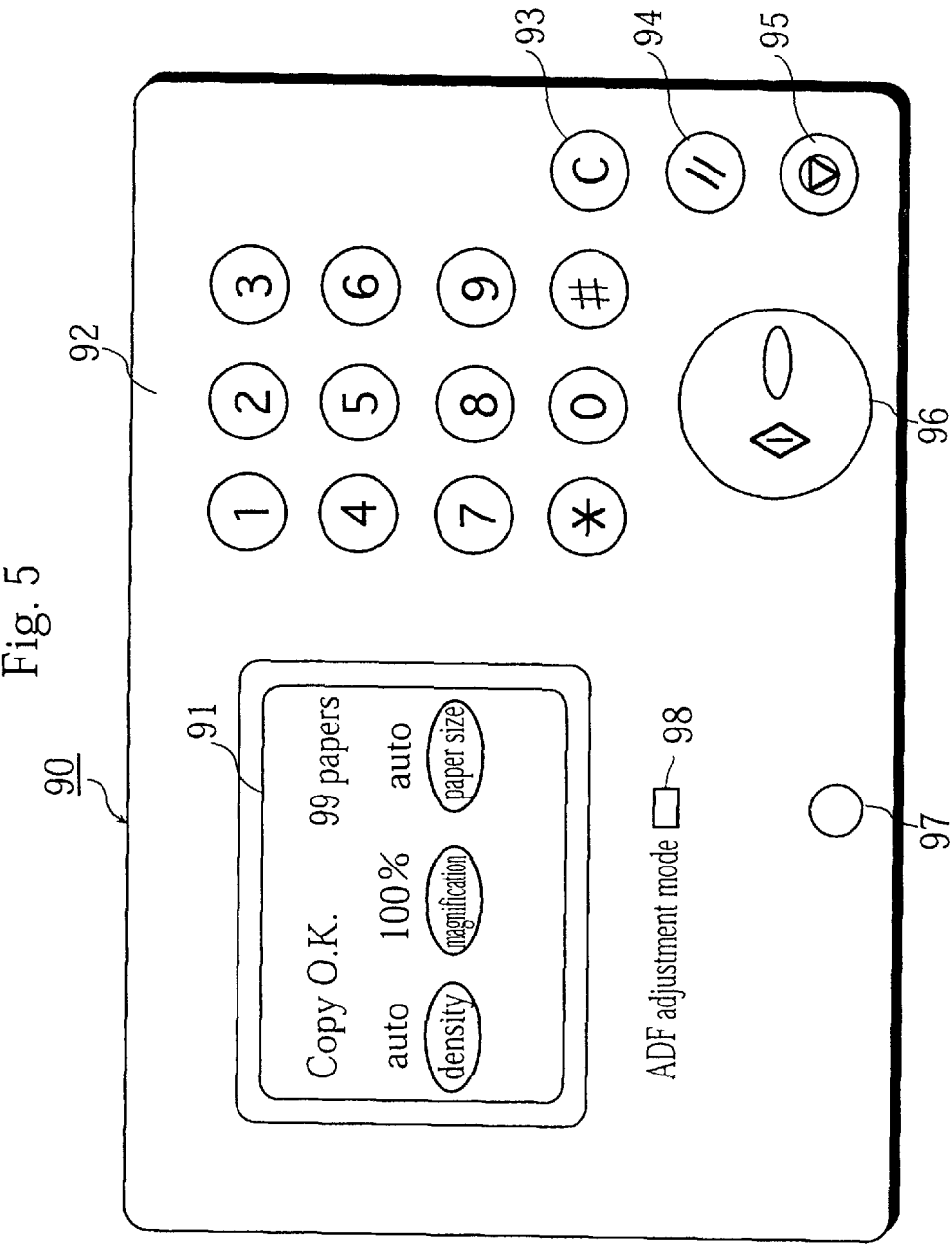

IMAGE READING APPARATUS HAVING AN AUTO DOCUMENT FEEDER

BACKGROUND OF THE INVENTION

(1) Field of the Invention

The present invention relates to an image reading apparatus that uses an auto document feeder for automatically conveying an original to an original reading position.

(2) Related Art

Conventionally, copying machines having an auto document feeder have been working in the following way: originals are set on a document feed tray of the auto document feeder and a start key is pressed by an operator; a paper feed roller and a carrying belt are driven; originals are conveyed to a standard original reading position of the image reading unit one by one and scanned by a CCD image sensor; and image data is obtained.

When an original-conveying distance of the auto document feeder is not properly set, an original is not conveyed to the standard original reading position as it should be. Then, even if the image is formed according to the image data obtained by scanning it, it cannot be reproduced as the original.

Therefore, when the copying machines are assembled in the factory or they are delivered to the users' hands, adjustment is applied to the auto document feeder so that the original shall be conveyed exactly. Specifically, there are two ways of adjustment.

One way goes as follows. After the auto document feeder is installed into the copying machine, it is put into operation and originals are actually conveyed to the platen glass. The auto document feeder is lifted and the dislocation between the position of the original on the platen glass and the standard original reading position is measured.

The other way goes as follows. The document image is actually copied onto a copy sheet and the above mentioned dislocation is judged from the image formed on the copy sheet. After that, the parameter for controlling the original-conveying distance of the auto document feeder is changed or the set position of the auto document feeder is adjusted.

However, according to the foregoing methods of adjustment, a great amount of expense in time and effort was required.

In the case of lifting the auto document feeder, it is likely that the original on the platen glass moves when the auto document feeder is lifted so that the dislocation cannot be measured exactly. On the other hand, in the case of judging the dislocation from the position of the image formed on the copy sheet, it is not always possible to judge the real amount of dislocation. In addition, the copy sheets and toner have to be wasted.

Even if the dislocation is accurately measured, it is necessary to learn from experience how much the control parameters have to be changed: there is no other way but to reduce the dislocation to "0" by trial and error.

The dislocation between the position of the original conveyed by the auto document feeder and the standard original reading position is generated not only in the direction of the original feed (subscan direction) but in the direction perpendicular to the direction of the original feed (main scan direction). Also, the foregoing dislocation is generated when the original is conveyed in the subscan direction with some inclination. A lot of expense are required to eliminate the dislocation.

A method was conceived to reduce such expense. According to this method, image data of the original dislocated by the auto document feeder is read as it is and the dislocation is modified by the data.

An example is disclosed by Japanese Patent Publication No. 64-5509. According to this reference, the inclination of the original on the platen glass is detected from the image data of the original, rotational processing is performed on the data by the degree of inclination, and the image is formed according to the corrected image data.

However, since such technique requires further processing time for the rotational processing of the data, high-speed copying can hardly be performed. If the degree of inclination is large so that a part of the original extend off the platen glass and the entire original data cannot be read, there is no possible way of modification.

Therefore, in order to read the original exactly by fast processing, the adjustment of the auto document feeder is indispensable. However, there has been no way of getting rid of the foregoing expense in time and effort.

SUMMARY OF THE INVENTION

The object of the present invention is to provide an image reading apparatus by which adjusting an original-conveyed position can be readily carried out.

The object can be achieved by the following construction.

An image reading apparatus having an original conveying apparatus comprising: an image reading unit for reading image of the original which is conveyed by said original conveying apparatus; a dislocation detector for detecting dislocation amount between a standard original reading position of said image reading unit and the position of the original conveyed by said original conveying apparatus; and a dislocation display for displaying said detected dislocation amount.

According to the above construction, the dislocation generated by conveying the original by the original conveying apparatus can be immediately confirmed so that the operator can readily adjust the dislocation.

The object can also be achieved by the following construction.

An image reading apparatus having an original conveying apparatus comprising: an image reading unit for reading image of the original which is conveyed by said original conveying apparatus; a dislocation detector for detecting dislocation amount in a subscan direction between a standard original reading position of said image reading unit and the position of the original conveyed by said original conveying apparatus; and a control unit for controlling the original-conveying distance of the original conveying apparatus according to the dislocation amount so that the dislocation is eliminated.

According to the above construction, the dislocation in the subscan direction can be automatically eliminated. Therefore, the operator does not have to make an adjustment in this direction.

BRIEF DESCRIPTION OF THE DRAWINGS

These and other objects, advantages and features of the invention will become apparent from the following description thereof taken in conjunction with the accompanying drawings. In the drawings:

FIG. 4 shows construction of the document feed tray provided to the auto document feeder;

FIG. 5 shows an example of construction of an operation panel of the copying machine;

DESCRIPTION OF THE PREFERRED EMBODIMENT

The following is an embodiment of the image reading apparatus of the present embodiment applied to a digital copying machine.

(1) Construction of the Digital Copying Machine

Figure 1:
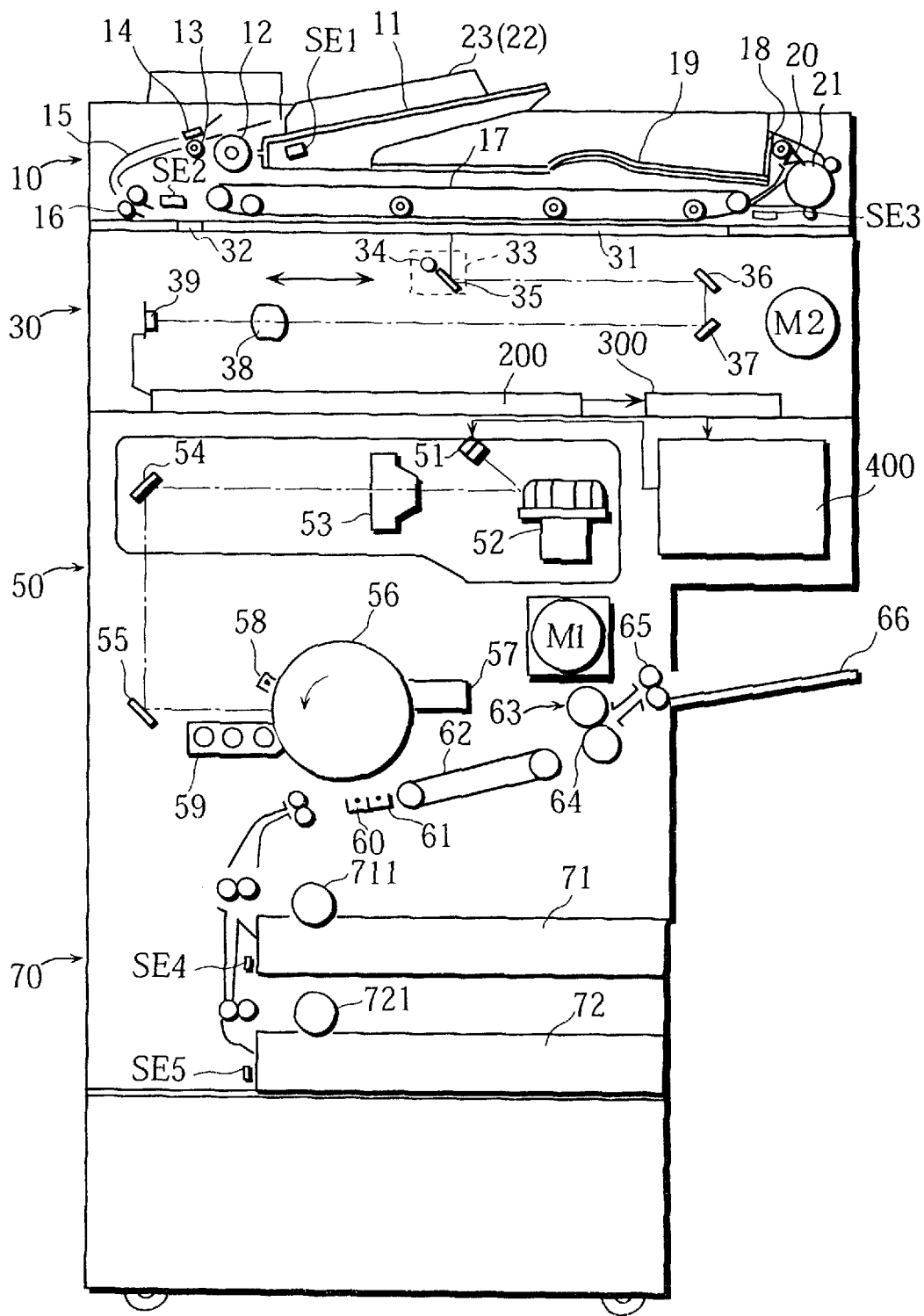
FIG. 1 shows construction of a copying machine to which the image reading apparatus of the present invention is applied.

FIG. 1 shows the construction of a digital copying machine (hereinafter will be referred to as "copying machine").

The copying machine comprises an auto document feeder (ADF) 10, an image reading unit 30, a printer unit 50, and a paper feed unit 70.

The auto document feeder 10 automatically conveys an original to the image reading unit 30. Originals placed on a document feed tray 11 are separated one by one by a paper feed roller 12, a separating roller 13, and a separating pad 14, and sent downward along a guide 15. By a register roller 16 and a carrying belt 17, the separated original is conveyed to a predetermined standard original reading position on a platen glass 31. At the left edge of the platen glass 31, a document scale 32 is set: the document scale 32 is used as a standard of the standard original reading position in the direction of subscan.

The original conveyed to the standard original reading position is scanned by a scanner 33 of the image reading unit 30, conveyed rightward in the figure by the carrying belt 17, and discharged onto a paper discharge tray 19 via a paper discharge roller 18.

In order to scan the back of the original as well, a switch claw 20 switches the original-conveying direction to a reversing roller 21. Turned upside down by the reversing roller 21, the original is conveyed to the standard original reading position on the platen glass 31 by the carrying belt 17.

When the back of the original is scanned, the carrying belt 17 conveys the original rightward in the figure, and then the original is discharged onto the paper discharge tray 19 as mentioned above. At this time, the next original waiting on the document feed tray 11 is conveyed to the standard original reading position.

The auto document feeder 10 can be lifted, with its side being hinged to the image reading unit 30, which will be explained in detail later. This construction makes it possible to place the original onto the platen glass 31 by hand.

Underneath the platen glass 31, the image reading unit 30 comprises a scanner 33 which moves as the arrow shows in the figure when driven by a scanner motor M2. The scanner 33 comprises an exposure lamp 34 and a mirror 35: the mirror 35 reflects the reflected light from the original caused by the irradiation of the exposure lamp 34 in the direction parallel to the platen glass 31. This reflected light is led to a CCD image sensor 39 (hereinafter will be refereed to as a "CCD sensor") via a mirror 36, a mirror 37, and a converging lens 38.

The analogue electric signals which underwent the photo-electric transfer by the CCD sensor 39 are converted into digital signals by A/D transfer in an image signal processing unit 200. The digital signal further undergoes correction of shading, density conversion, and edge-emphasizing, and then is stored in a memory unit 300 as image data.

The image data stored in the memory unit 300 is read by a printing processing unit 400 and converted into control signals for controlling output of a laser diode 51 in the printer unit 50.

The laser light emitted from the laser diode 51 is reflected on the surface of a polygon mirror 52 which rotates at a constant angular velocity. And via a f$\phi$ lens 53, a mirror 54, and a mirror 55, the laser light scans the surface of a photosensitive drum 56; the surface of a photosensitive drum 56 is being exposed by the laser light.

Before being exposed by the laser light, the photosensitive drum 56 has the residual toner on its surface cleared off by a cleaning unit 57. After being discharged by the irradiation of an eraser lamp (not illustrated), the surface of the photosensitive drum 56 is uniformly charged by a sensitizing charger 58. If the photosensitive drum 56 is exposed by the laser light, an electrostatic latent image is formed on the surface of the photosensitive drum 56.

A developing unit 59 contains developer composed of black toner and a carrier. The developing unit 59 develops the foregoing electrostatic latent image by supplying the toner.

The paper feed unit 70 comprises a paper cassette 71 and a paper cassette 72. The size of the copy sheet such as the copy sheets and OHP films in the cassettes are detected by photo-electric paper size detection sensors SE4 and SE5. The detected signal is sent to a CPU 106 (FIG. 6), which will be explained later.

Being simultaneous with the exposure or the development with regard to the photosensitive drum 56, a copy sheet of the necessary size (not illustrated) is fed from one of the paper cassettes 71 and 72 by the paper feed roller 711 or paper feed roller 712. Then the sheet is in contact with the downward surface of the photosensitive drum 56, and by the electrostatic power of a transfer charger 60, the toner image formed on the surface of the photosensitive drum 56 is transferred onto the surface of the copy sheet.

After that, the copy sheet is separated from the surface of the photosensitive drum 56 with the help of a separating charger 61 and sent to a fixing unit 63 by a carrying belt 62.

The toner image transferred onto the copy sheet is so unstable that it will readily fall off the sheet when touched. Therefore, by heat pressing in the fixing unit 63 with a fixing roller 64 having a heater inside, the toner image is fixed onto the copy sheet. After that, the copy sheet is discharged onto a discharge tray 66 by a discharge roller 65.

SE1 is a document detection sensor for detecting existence of originals on the document feed tray 11. SE2 and SE3 are original edge detection sensors for detecting edges of the original. Their operations will be explained later.

Figure 2:
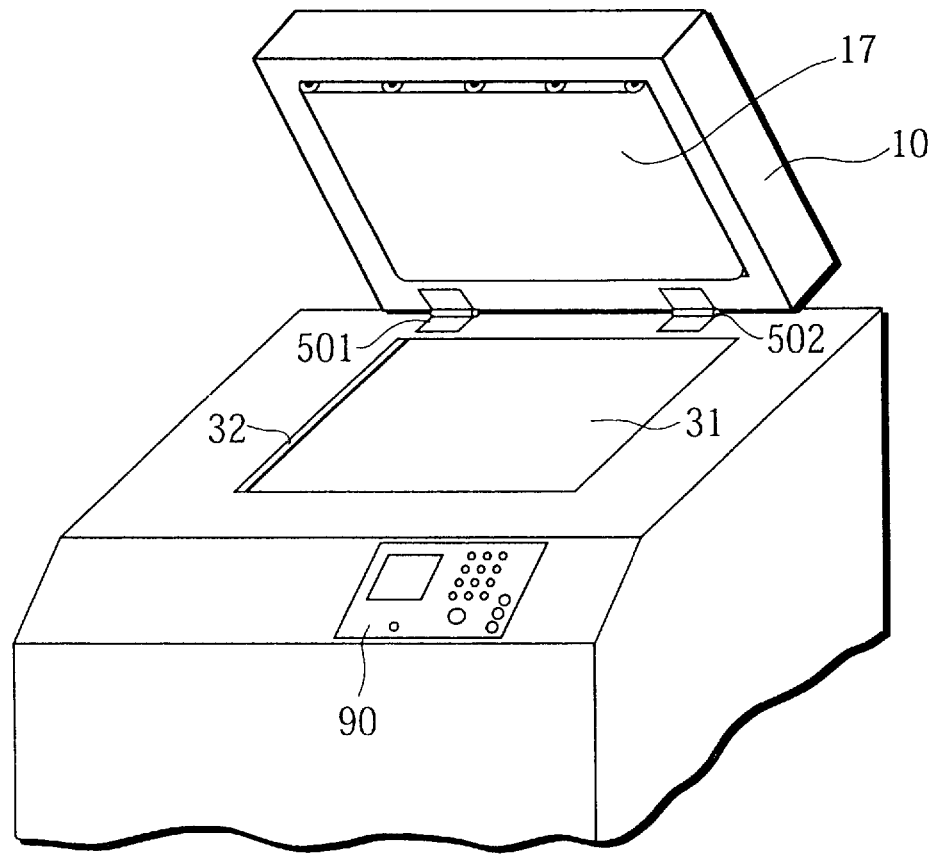
FIG. 2 is an oblique view of an upper part of the copying machine when the auto document feeder is lifted.

FIG. 2 is an oblique view of the upper part of the copying machine when the auto document feeder 10 is lifted. As is shown by the figure, the auto document feeder 10 is hinged to the top surface of the image reading unit 30 with a hinge 501 and a hinge 502 so that the auto document feeder 10 can be lifted. Normally, the hinges 501 and 502 are spring-loaded, which makes it possible to stabilize the auto document feeder 10 when it is lifted. The springs are not illustrated in the figure.

Figure 3A:
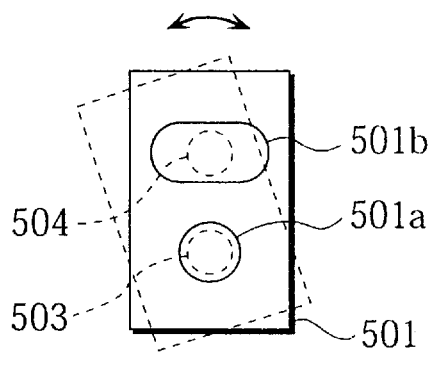
FIGS. 3A and 3B show enlargement of the hinge 501 and hinge 502 that attach the auto document feeder to the copying machine.
Figure 3B:
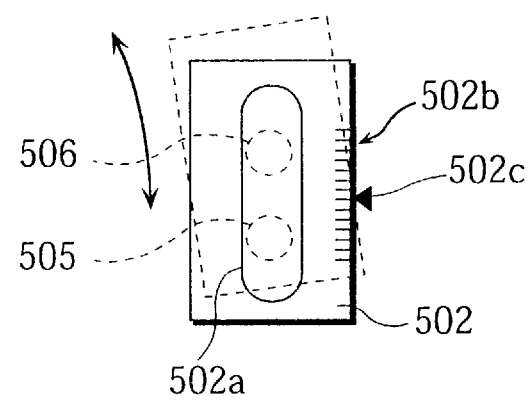

Both FIGS. 3A and 3B show enlargement of the part of the hinge 501 and hinge 502 that are attached to the top surface of the image reading unit 30. The hinge 501 has a round hole 501a and a rectangular hole 501b. The hinge 502 has a rectangular hole 502a. The circles of the broken line show screw holes 503–506 provided on the top surface of the image reading unit 30. When the auto document feeder 10 is attached, the hinges 501 and 502 are temporarily screwed by four bolts (not illustrated). The original feed direction of the auto document feeder 10 is made parallel to the subscan direction of the image reading unit 30 in the following way. By rotating the hinges as the arrows show in the figure, with the bolt for the round hole 501a being a supporting point, the attachment position moves as shown by the broken line. By fine-tuning the angle, each bolt is fastened.

The scale 502b provided on the hinge 502b shows the degree of the adjustment of the original-conveying direction by 1° in relation to the subscan direction. By adjusting the scale 502b to the arrow pointer 502c set on the image reading unit 30, the original-conveying direction of the auto document feeder 10 can be accurately adjusted.

FIG. 4 shows the auto document feeder 10 seen from above. The document feed tray 11 comprises a document guide 22 and a document guide 23. The document guide 22 is fixed to the document feed tray 11 by the bolt 22b via the rectangular hole 22a. By loosening the bolt 22b, the document guide 22 can move in the direction of the arrow in the figure and is adjusted so that the side edge of the original fed by the auto document feeder 10 comes to the standard position on the platen glass 31 in the main scan direction.

The document guide 23 is attached in a way that it can slide largely in the direction of the arrow in the figure, with a projection 23b on the bottom side of the document guide 23 being engaged in a long flute 23a on the document feed tray 11, the long flute 23a being perpendicular to the original-conveying direction. Therefore, according to the size of the original, the width between the guides 22 and 23 can be adjusted.

The scale 22c on the document guide 22 is calibrated into 1 mm. By adjusting the scale 22c to a pointing arrow 22d on the document feed tray 11, it is possible to adjust the position of the document guide 22 accurately in the main scan direction.

Going back to FIG. 2, an operation panel 90 is set in front of the copying machine so that an operator can input easily.

FIG. 5 shows an example of the construction of the operation panel 90 which comprises: a liquid crystal touch panel 91 for displaying various modes; ten keys 92 for inputting the number of copies and the rate of magnification; a clear key 93 for returning the number of copies set by the operator to a standard value "1"; a panel reset key 94 for returning the various copy modes to the standard condition; a stop key 95 which stops printing operations; a start key 96 for designating start of the copying operation; and an ADF adjustment mode key 97 which will be explained later.

An ADF adjustment mode display LED 98 glows when the ADF adjustment mode is set by the ADF adjustment mode key 97 so that the operator can recognize whether such a mode is set or not.

The liquid crystal touch panel 91 comprises touch panel on the liquid crystal display panel. In addition to the number of copies, copy density, copy magnification, and size of the copy sheet, the liquid crystal touch panel 91 displays information on various abnormalities such as paper jam and paper empty. A desired input is possible by touching a corresponding button on display.

(2) Construction of the Control Unit

Figure 6:
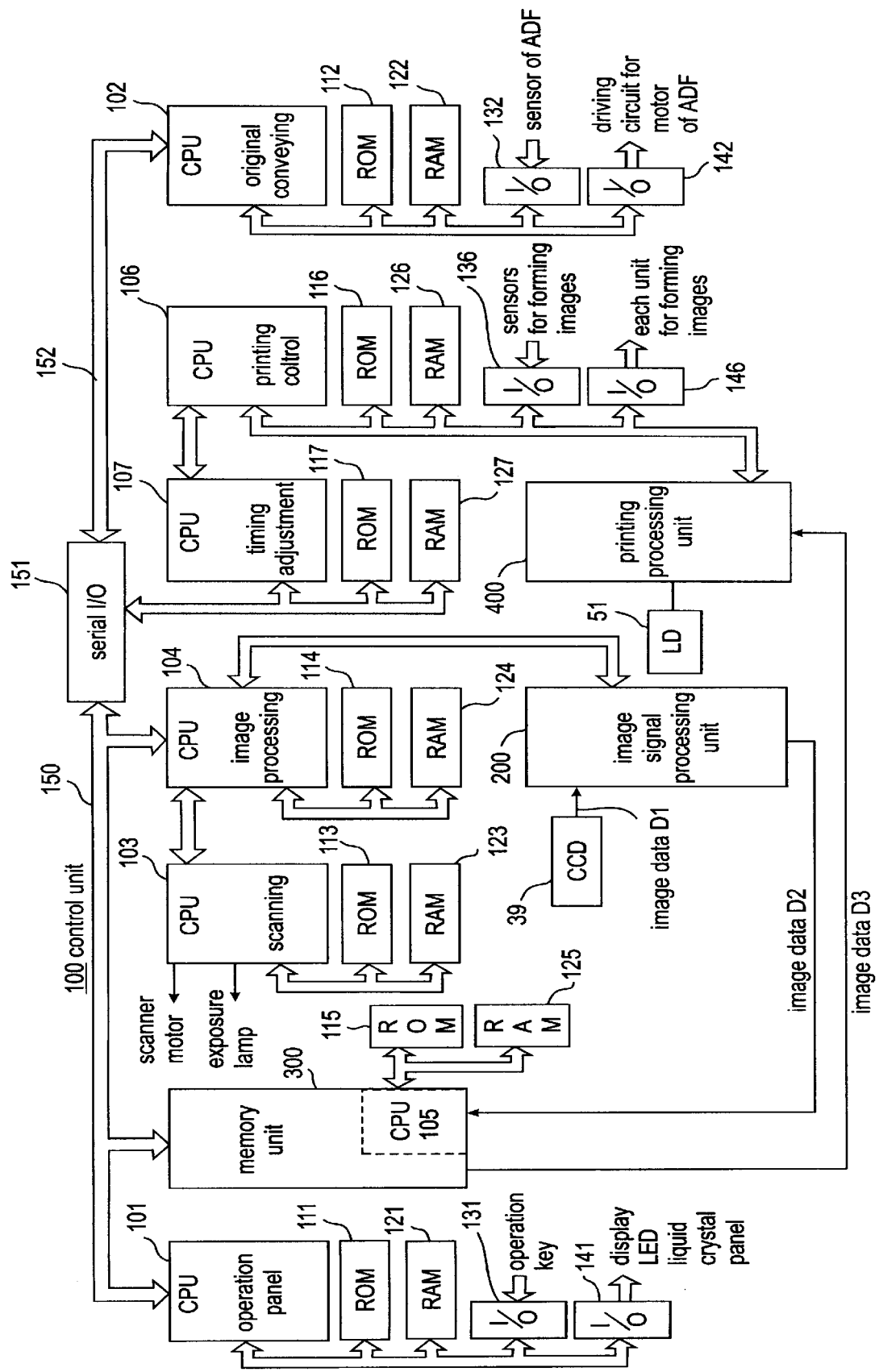
FIG. 6 is a block diagram of a controlling unit of the copying machine.

The construction of a control unit 100 installed inside the foregoing copying machine can be explained as follows by means of the block diagram in FIG. 6.

The control unit 100 mainly comprises CPUs 101–107. The CPUs 101–107 have ROMs 111–117 and RAMs 121–127, respectively: the ROMs 111–117 store programs necessary for controlling copying operation; and RAMs 121–127 serve as work areas when each program is implemented.

The CPUs 101–107 are interconnected via a data bus 150, a data bus 151 and a serial I/O so that they can mutually send/receive data and command by interruption control.

Once the copying machine is powered, each of the CPUs 101–107 reads the initial program of its own ROM, initializes each unit of the copying machine, starts measuring time using an internal timer, and sees to it that the time of each routine is within a predetermined time period.

The construction and operation of the control unit 100 will be explained according to the following procedure: receiving key input by an operator; reading the original; processing the image data; and printing.

The CPU 101 notifies other CPUs of instructions from an operation panel 90 and controls display of the operation panel 90. More specifically, the CPU 101 receives signals from operation keys of the operation panel 90 via an I/O port 131, and controls the display of a liquid crystal touch panel 91 and flickering of the ADF adjustment mode display LED 98.

In other words, the ROM 111 stores a panel display program and initial-display-mode data. Once the copying machine is powered, the initial-display-mode data is read, and then an initial screen display appears on the liquid crystal panel 91. For example, when the operator touches the "paper" button on the liquid crystal touch panel 91 (FIG. 5), the list of the paper sizes set in the paper cassettes is displayed by the display program in the ROM 111. When the operator selects a paper size from the list, the selected paper size is stored into the RAM 121.

After setting the necessary mode from the operation panel 90, the start of copying operation is designated by operating the start key 96, the CPU 102 controls the operation of the auto document feeder 10 and then the original is conveyed to the image reading unit 30.

In other words, on receiving the designation of the start of the copying, the CPU 102 confirms the existence of the original by the signal from the document detection sensor SE1 (FIG. 1) obtained via the I/O port 132. The document detection sensor SE1 may be a reflective type photo-electric sensor comprising a light-emitting element and photo-electric conversion element. When the original is placed onto the document feed tray 11, the photo-electric conversion element receives reflection light and sends a detection signal, and then the existence of the original can be detected.

When the original is detected, a motor (not illustrated) drives the paper feed roller 12, the separating roller 13, and the register roller 16, all of which function in combination so that the original travels inside the auto document feeder 10. By the carrying belt 17, the original is conveyed to the standard original reading position on the platen glass 31.

The original-conveying distance of the auto document feeder 10 can be controlled as follows.

When the document edge detection sensor SE2 (FIG. 1) detects the rear edge of the original conveyed by the register roller 16. On receiving a signal detected by the sensor SE2, the CPU 102 starts counting the clock pulses of an internal clock pulse generating circuit. When the number of the clock pulses reaches a first count number stored in the ROM 112, the CPU 102 stops the carrying belt 17. In this way, the rear end of the original is adjusted to the document scale 32.

In order to scan the back of the original as well, the document edge detection sensor SE3 detects the front edge of the original which has been turned upside down by the reversing roller 21. On receiving this signal, the CPU 102 starts counting the clock pulses as mentioned above. When the number of the clock pulses reaches a second count number stored in the ROM 112, the CPU 102 stops the carrying belt 17. In this way, the front edge of the original is adjusted to the document scale 32.

The document edge detection sensors SE2 and SE3 may be the reflective type photo-electric sensor like SE1, or they may be transmissible type photo-electric sensors having the light emitting element and the photo-electric conversion element opposed with each other, or they may be limit switches.

The front and rear edges of the original can be detected by monitoring changes of the output of the document edge detection sensor SE2 with the CPU 102. For example, on condition that the output of the sensor is H level when the original is detected and the output of the sensor is L level when the original is not detected, the rear edge can be detected when the H level changes to L level and the front edge can be detected when the L level changes to H level.

The original-conveying distance of the auto document feeder 10 can be controlled by using the counted number of the clock pulses as the parameter as mentioned above, However, it may also be controlled by counting the number of rotation of the driving roller of the carrying belt 17 by the light encoder and using the number as the parameter.

Depending on the attachment condition of the auto document feeder 10 or type of copying machine, it is necessary to adjust the foregoing first and the second count number. How to adjust them will be explained later.

When the original is conveyed to the standard original reading position by the auto document feeder 10 in the above mentioned way, the CPU 102 sends a notification to the CPU 107, and then the CPU 107 sends a scan request to the CPU 103, providing timing. On receiving the scan request from the CPU 107, the CPU 103 controls the original scanning by the image reading unit 30. The operation can be explained more specifically as follows.

The ROM 103 stores a program necessary for the original scanning. The CPU 103 reads the program, emits control signals with providing timing according to the program, turns on the exposure lamp 34, and drives the scanner motor M2, and sends the image data D1 of the original read by the CCD sensor 39 to the image signal processing unit 200.

The image signal processing unit 200 comprises an A/D converter, a shading correcting unit, an MTF correcting unit, a magnification unit, and a γ correcting unit. When controlled by the CPU 104, the inputted image data D1 is converted into digital multi-value signals by the A/D converter. The digital multi-value signals undergo the following: correction of the irregular luminosity of the exposure lamp 34 or the irregular sensitivity of the CCD sensor 39 by the shading correcting unit; processing to improve image quality like edge emphasizing by the MTF correcting unit; and magnifying by the magnification unit or γ correcting processing by the γ correcting unit. After that, the digital multi-value signal is sent to a memory unit 300 as the image data D2.

Figure 7:
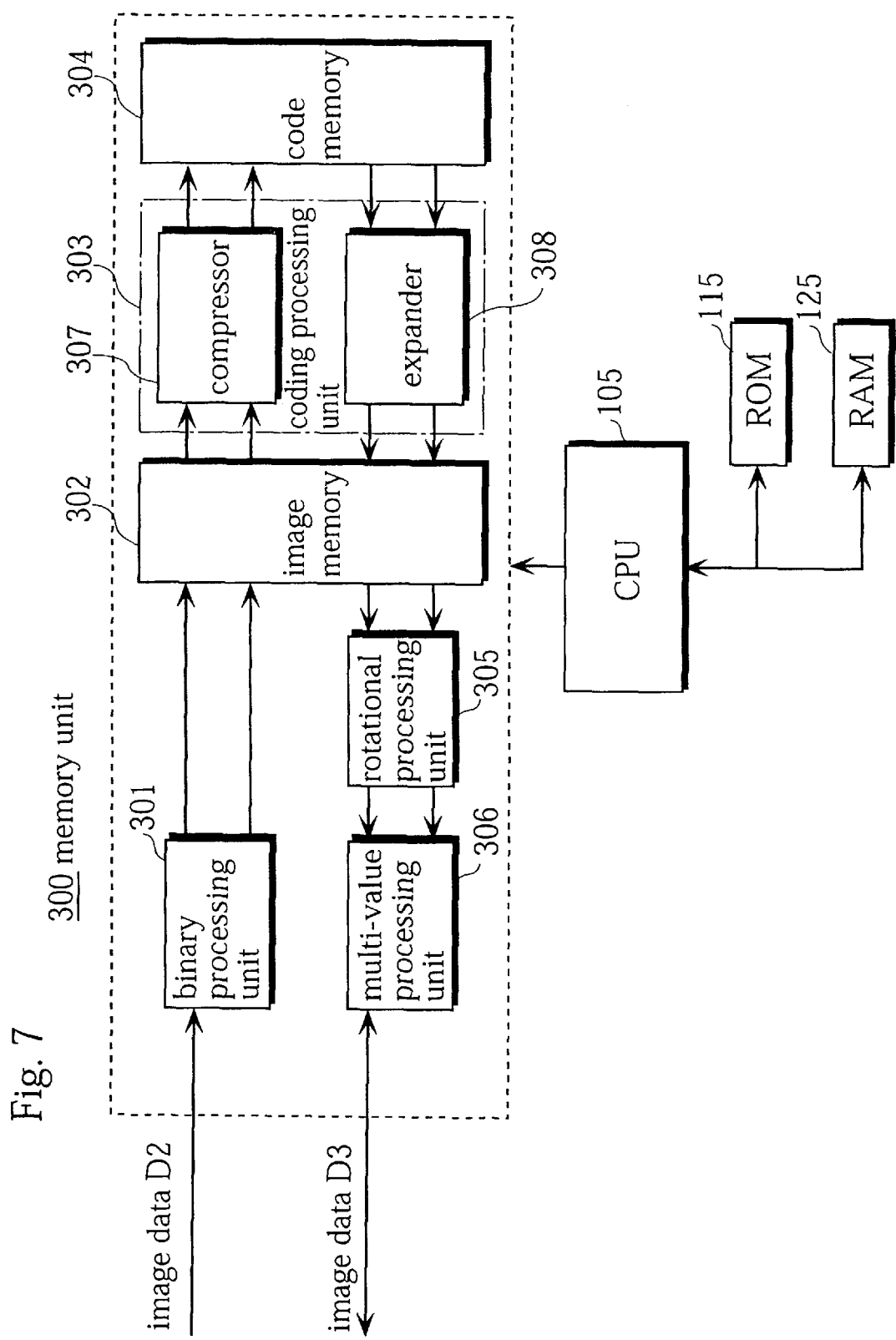
FIG. 7 hows a block diagram of a memory unit of the controlling unit.

FIG. 7 shows the memory unit 300 comprising a binary processing unit 301, an image memory 302, a coding processing unit 303, a code memory 304, a rotational processing unit 305, multi-value processing unit 306, and the CPU 105 for controlling the foregoing 301–306, a ROM 115 for storing the control program, and a RAM 125 which serves as a work area.

The binary processing unit 301 converts the inputted multi-value image data into a binary data according to the parameter given by the CPU 105 beforehand. The multi-value processing unit 306 generates multi-value data according to the parameter given by the CPU 105.

The image memory 302 is a memory of multi-port memory which has the capacity for storing the image data of an A4 size page with the pixel density being 400 dpi.

The coding processing unit 303 comprising a compressor 307 and an expander 308 so that compressing and expanding the image data can be carried out separately. The code memory 304 comprises a multi-port and stores the data coded by the compressor 307.

As is mentioned above, each of the image memory 302 and the code memory 304 has a multi-port, and the code processing unit 303 can carry out the compressing and expanding separately at the same time, a series of operations composed of reading the image data from the image memory 302, compressing the image data by coding and storing the coded data into the code memory 300 and another series of operation of reading the image data from the code memory 304, expanding the image data by decoding and storing the expanded data into the image memory 302 can be carried out at the same time. Therefore, fast data processing can be realized.

When the coded data is stored into the code memory 304, a control table which shows memory areas of the coded data for each page is generated and stored in the RAM 125. When the data has to be read, the coded data of the desired page can be read by referring to this control table.

The rotational processing unit 305 is a well-known circuit which rotates the reproduced position of the image data so that the image of the original is reproduced on the copy sheet after being rotated by a given degrees, for example 90°.

The memory unit 300 thus constructed carries out the following image data writing/reading operation on receiving the control by the CPU 105.

When the scanner 33 completes reading a page of the original, the image data is changed into binary data by the binary processing unit 301 and written into the image memory 302. Then, each of the CPUs 103 and 105 send a notification to the CPU 107 that the reading has been completed. On receiving the notification, the CPU 107 sends a compression request to the CPU 105.

Then, the CPU 105 reads the binary image data from the image memory 302, and sets a write address to the code memory 304, X-Y length information, and mode of the compressor 307 (e.g. MH method), and instructs the coding processing unit 303 to carry out compressing. The compressed coded data is stored into the code memory 304, which means that the compressing has been completed. The CPU 105 sends a notification to the CPU 107 that the compression has be completed.

For the reading operation, the CPU 107 sends an expanding request to the CPU 105. On receiving this request, the CPU 105 reads the coded data from the code memory 304 and sets the write address to the image memory 302, the X-Y length information, and a mode of the expander 308 (e.g. the foregoing MH method), and activates expanding. Then expanding is carried out and the decoded image data is written into the image memory 302. When the expanding is completed, the CPU 105 sends a notification to the CPU 107 that the expanding has been completed.

In order to read the image data from the image memory 302, the CPU 107 sends a memory preparation request to the CPU 105. On receiving the memory preparation request, the CPU 105 makes preparations for reading, such as setting the read start address of the image memory 302 in order to output the image data D3 from the image memory 302 to the printing processing unit 400. On completing the preparation, the CPU 105 sends a notification to the CPU 107 that the memory preparation has been completed. On receiving this notification, the CPU 107 sends a printing request to both the CPU 105 and the CPU 106.

Then, the CPU 105 reads the corresponding image data from the image memory 302, performs rotational processing in the rotational processing unit 305 if it is necessary, converts the image data to multi-value data in the multi-value processing unit 306, and sends the image data to the printing processing unit 400 as the image data D3.

The CPU 106 comprehensively controls the operations of the foregoing printing processing unit 400, printer unit 50 and the document feed tray 70, and forms an image on the copy sheet. The operation can be more specifically explained as follows.

The ROM 116 stores a program for the printing control. According to the program, the CPU 106 inputs the image data D3 read from the memory unit 300 into the printing unit 400, and instructs the printing unit 400 to control the output of the laser diode (LD) 51. On the other hand, via the I/O port 146, the CPU 106 controls rotation of the main motor M1 and ON-OFF operations of clutch mechanisms which conveys the rotation to a rotational axis of the photosensitive drum and a rotational axis of a roller of the carrying belt 62. Then, printing onto the copy sheet is carried out.

At this time, detection signals of various sensors for forming images are inputted into the CPU 106 via the I/O port 136. For example, by the detected values of a density detection sensor which detects the amount of the toner attached onto the surface of the photosensitive drum 56, a temperature sensor, and a humidity sensor, the CPU 106 controls the output of a sensitivity charger 58 and a transfer charger 60 so as to produced the best possible copy. And, the CPU 106 controls the paper conveying operation by properly selecting the paper cassette by a size detection signal from the paper size detection sensors SE4 and SE5. The CPU 106 also judges paper jam by a signal from a jam detection sensor (not illustrated), and displays the notification on the liquid crystal touch panel 91 of the operation panel 90 via the CPU 101.

When the printing of the necessary number of copies is implemented according to the image data D3 read from the memory 302, both CPU 105 and CPU 106 send a notification to the CPU 107 that the printing has been completed. On receiving the notification, the CPU 107 sends a memory clear request to the CPU 105, and then the CPU 105 erases the image data which has undergone the printing in the image memory 302 and the code memory 304. At this time, the corresponding information in the control table is erased, thus completing a series of copying operations.

The CPU 107 controls operations of the CPUs 101–106, providing timing. The CPU 107 reads the necessary control program from the ROM 117, and sees to it that the foregoing copying operation goes smoothly by comprehensively controlling the entire routine processing by using the inner timer.

(3) Adjusting Dislocation of the Original

As is already mentioned, when the auto document feeder 10 is not attached to the proper position, the original-conveying distance or the attachment condition of the auto document feeder 10 has to be adjusted. The adjustment (hereinafter will be referred to as ADF adjustment) can be explained as follows.

First, the operator presses the ADF adjustment mode key 97 of the operation panel 90 (FIG. 5), and then the ADF adjustment mode is set in the CPU 107 via the CPU 101.

Figure 8:
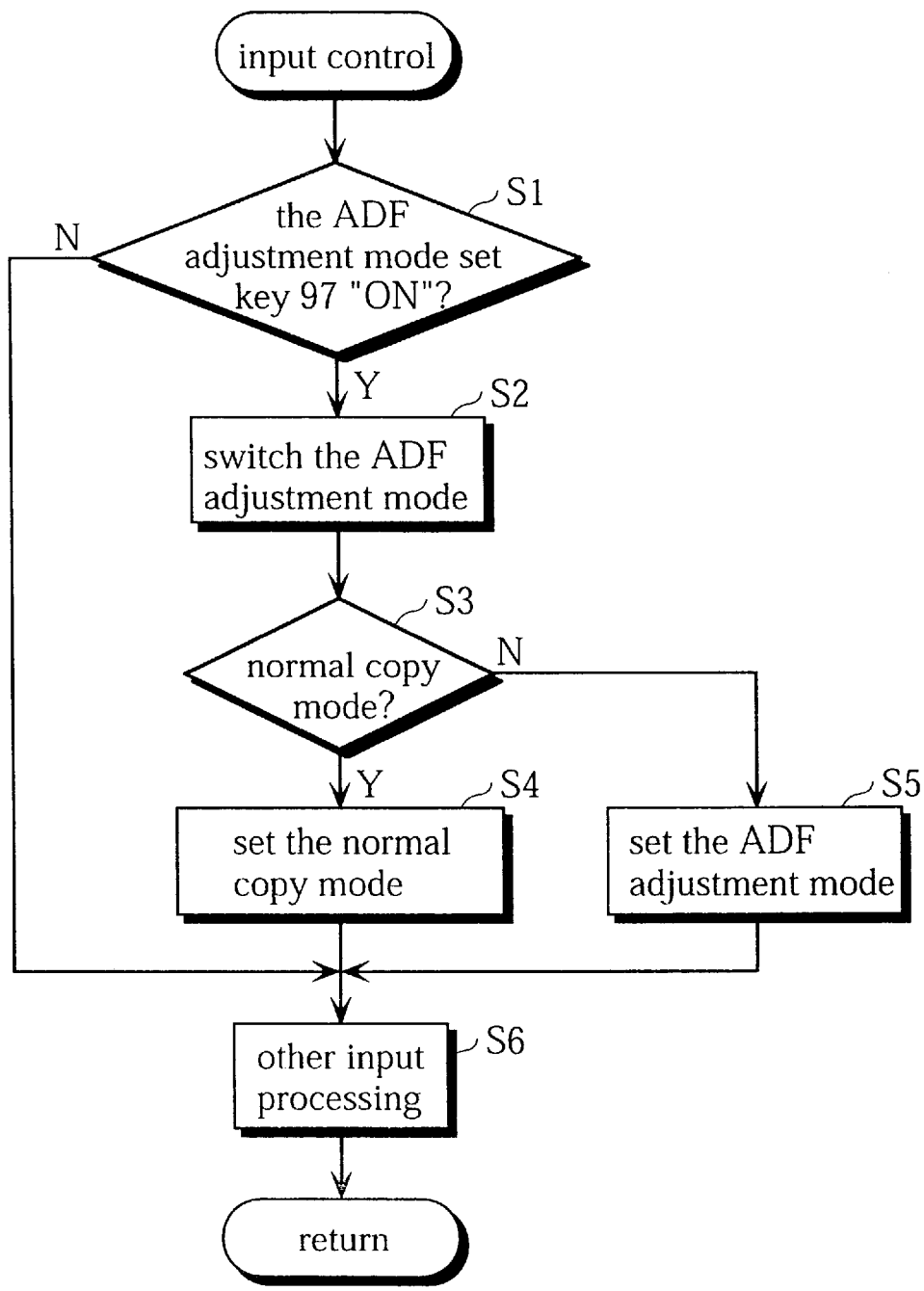
FIG. 8 is a flowchart showing a sub-routine of input control when an ADF adjustment mode is set in the control unit.

FIG. 8 is a flowchart showing a sub-routine of the input control in the CPU 101 when the ADF adjustment mode is set.

For this input control, the "ADF adjustment mode" and the "normal copy mode" changes alternately every time the ADF adjustment mode key 97 is pressed (Steps 1 and 2). If the switched condition is the normal copy mode, the "normal copy mode" is set (Steps 3 and 4). If the switched condition is an ADF adjustment mode, the "ADF adjustment mode" is set (Steps 3 and 5). At the same time, other input processing is implemented, such as operating a ten-key (Step 6), and finally, the sub-routine returns to a main routine (not illustrated) which controls the entire copying machine.

When the ADF adjustment mode key 97 is not pressed in Step 1, Step 6 immediately follows, and other key input processing is carried out. Finally, the sub-routine returns to the main routine.

When the operator presses the start key 96 with the ADF adjustment mode being set from the operation panel 90, the operator's instruction is sent to the CPU 107 from the CPU 101. The CPU 107 instructs the CPU 102 to convey the original to the image reading unit 30, instructs the CPU 103 to scan the original, instructs the CPU 104 to process the image data in the image signal processing unit 200, instructs the CPU 105 in the memory unit 300 to make the image data into binary data, and stores it into the image memory 302. The conveying of the original and the scanning are carried out until no original is left on the document feed tray. The CPU 105 calculates the ADF adjustment amount according to the image data, which will be explained more in detail later.

Figure 9:
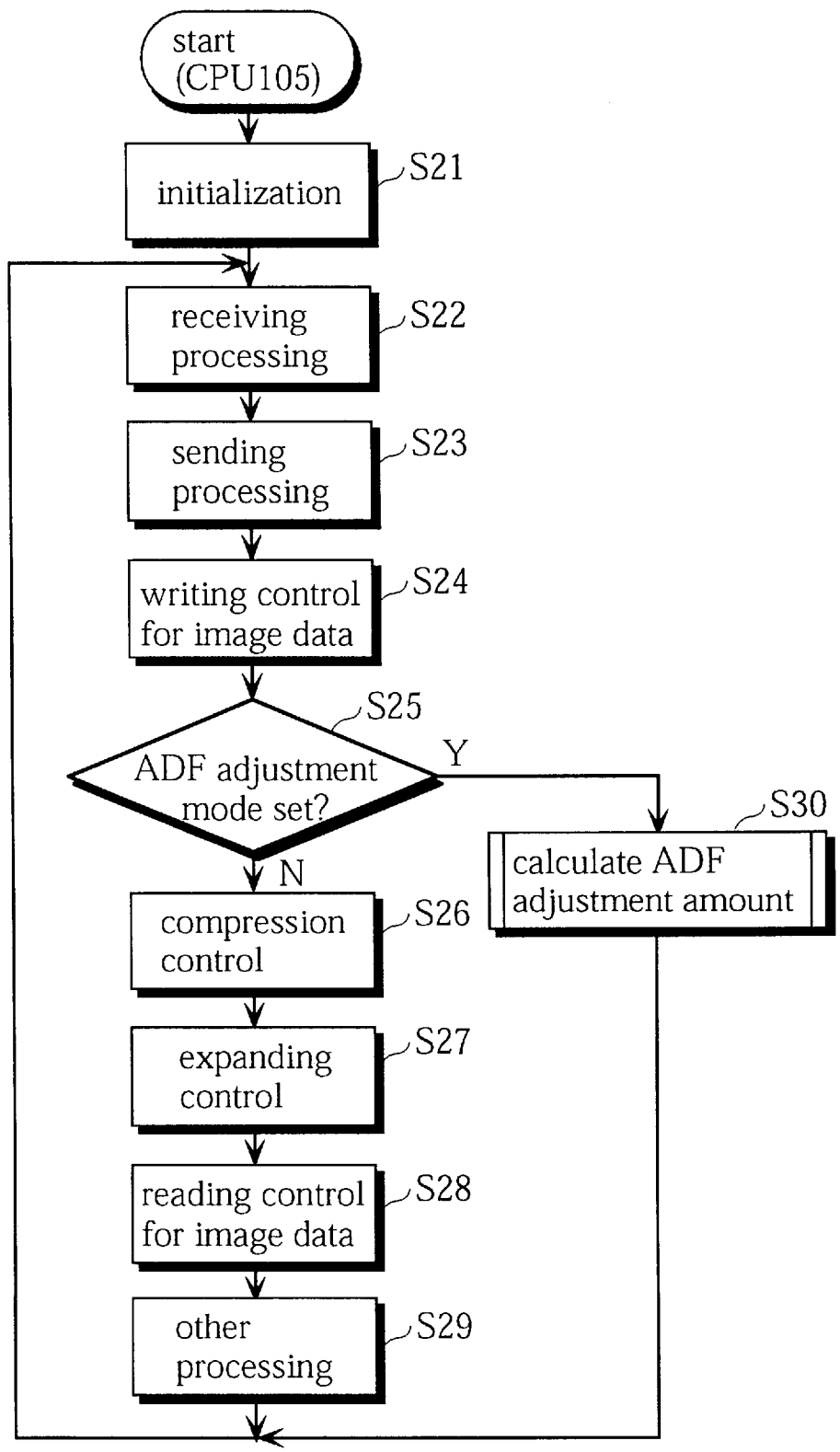
FIG. 9 is a flowchart showing writing/reading control and calculation control of the ADF adjustment amount in the memory unit in the control unit.

FIG. 9 is a flowchart showing control operation of the CPU 105.

Each register in the CPU 105 is initialized by the program stored in the ROM 115 when the copying machine is powered (Step 21). The CPU 105 receives/sends processing between the CPUs (Steps 22 and 23), and writes the image data processed by the image signal processing unit 200 into the image memory 302 in FIG. 7 (Step 24).

Next, the CPU 105 judges whether the ADF adjustment mode has been set (Step 25). If that is not the case, the CPU 105 compresses the image data written in the image memory 302 and stores the coded data into the code memory 304. On receiving a printing request from the CPU 107, the CPU 105 does the following: reads the corresponding coded data from the code memory 304, expands it, and writes it into the image memory 302 (Step 27); reads the image data from the image memory 302 (Step 28); and carries out other processing such as rotational processing and generating multi-value data (Step 29). Then, the CPU 105 sends the image data to the printing processing unit 400 and carries out the next receiving processing (Step 22).

If the ADF adjustment mode is set in Step 25, the ADF adjustment amount is calculated (Step 30), and sent to the CPU 107. After the calculation, as printing is not needed in this ADF adjustment mode, Step 22 immediately follows, skipping Steps 26–29, and the CPU 105 waits for receiving the next command.

Figure 10:
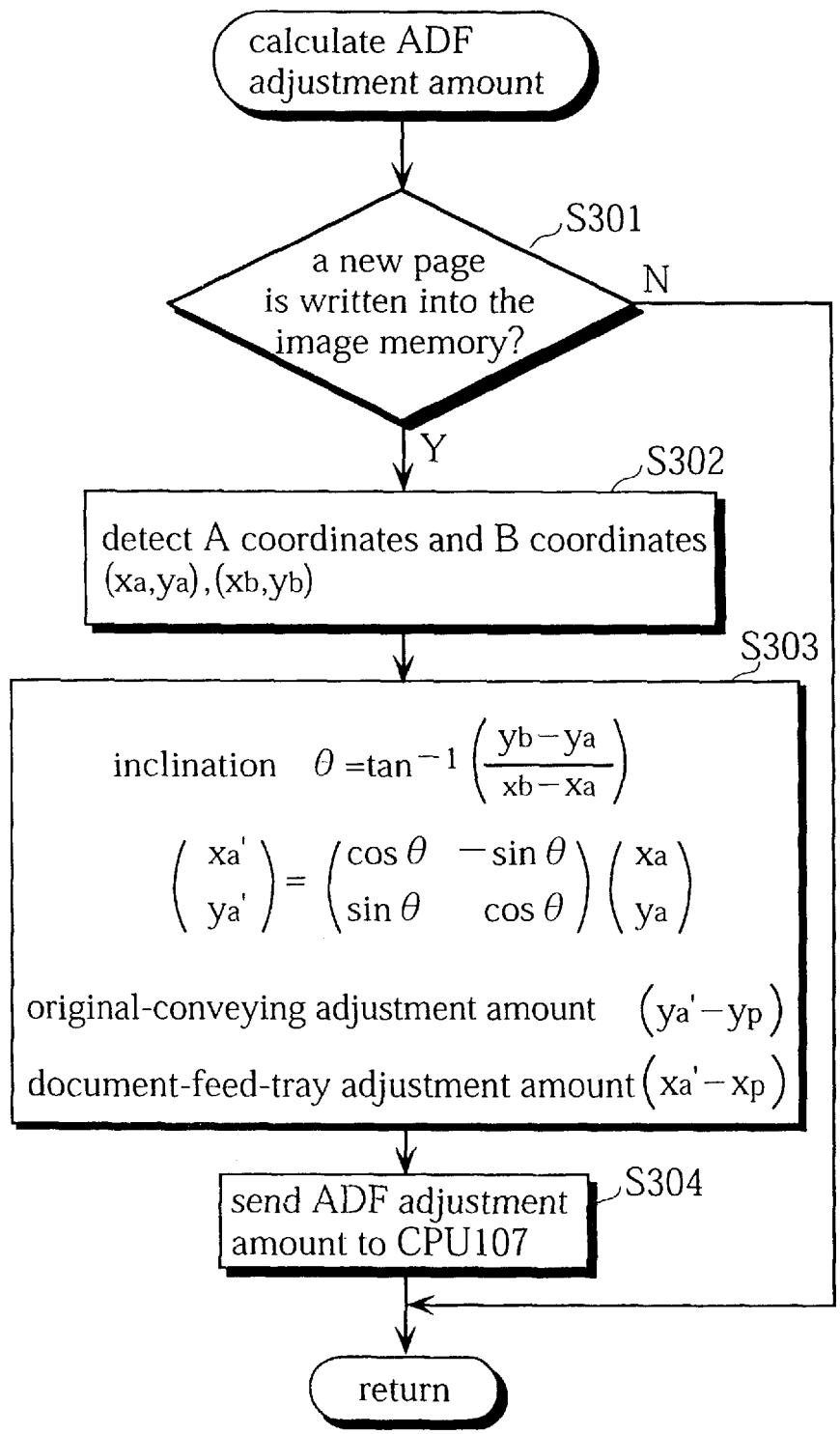
FIG. 10 is a flowchart showing a sub-routine of calculation of the ADF adjustment amount in the memory unit.

FIG. 10 is a flowchart showing calculation processing of the ADF adjustment amount in Step 30 in FIG. 9.

Figure 11:
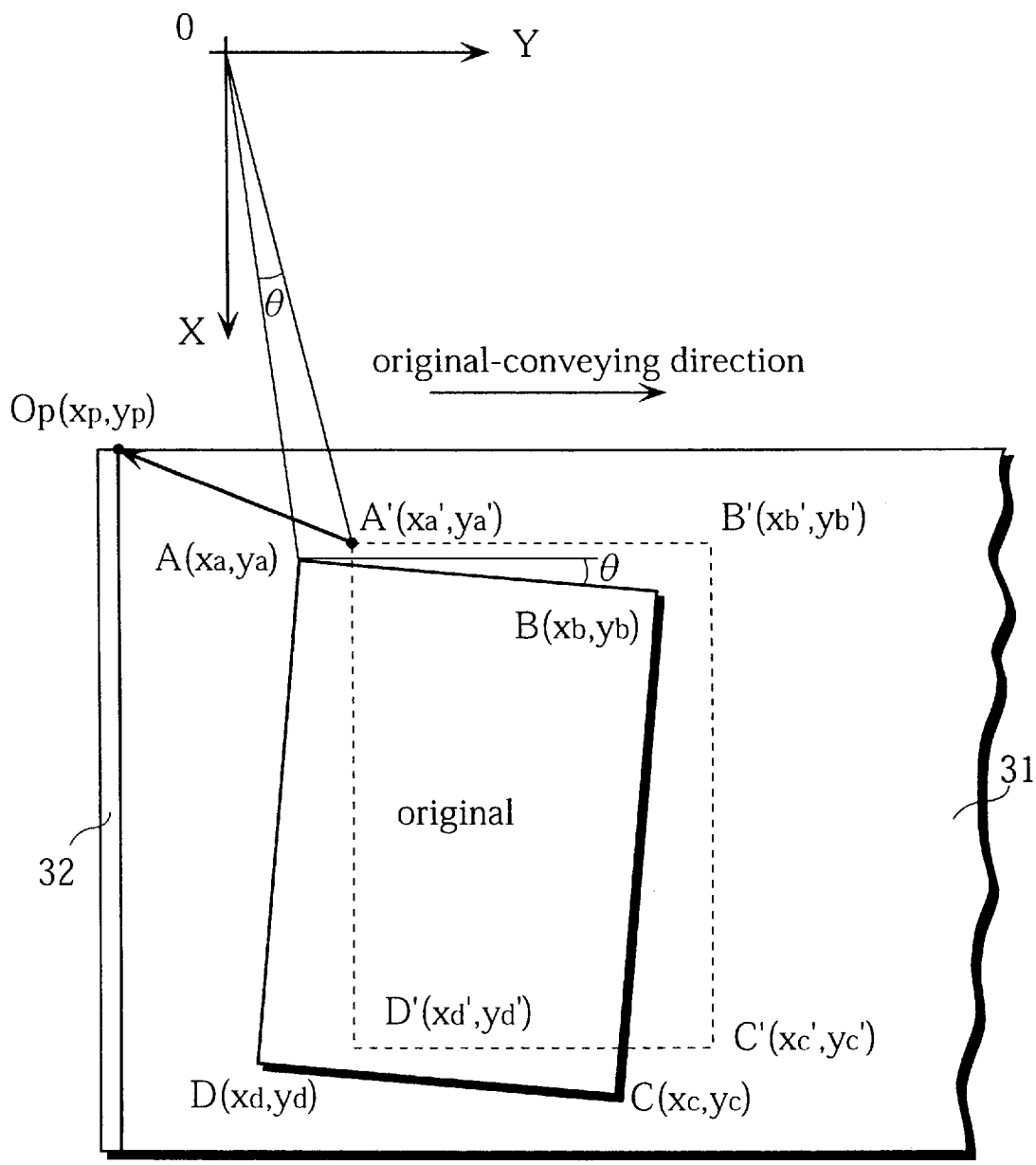
FIG. 11 shows the dislocation amount when a vertex of the original is set to a standard original reading position at the corner of a platen glass.

This flowchart shows a case in which the original is conveyed to the position shown by rectangular ABCD illustrated by the solid lines in FIG. 11, while the standard original reading position is the position when the top left corner of the original is placed on the top left corner of the platen glass 31.

In FIG. 11, "O" is the standard attachment point of the auto document feeder 10, which is set outside of the platen glass 31 ("O" corresponds to the center of the hole 501a in FIG. 3A). As is already mentioned, the original-conveying direction can be adjusted by rotating the auto document feeder 10, using the "O" as the center. X-Y coordinate system is assumed, with this "O" being regarded as the origin, subscan direction being regarded as Y-axis, and main scan direction being regarded as X-axis. In this X-Y coordinate system, the dislocation between the original and the standard original reading position (the ADF adjustment amount) is calculated.

The point "Op" is located at the top left corner of the platen glass 31, and it is a standard point for determining the standard original reading position. By placing the vertex A of the original on the point "Op" and adjusting the corners, the standard original reading point can be set.

In FIG. 10, when the original is conveyed to the position on the platen glass shown by the rectangular ABCD in solid lines in FIG. 11, the image data obtained by reading the image reading unit 30 is written into the image memory 302 in FIG. 7 (Step 301). When a new page of image data is written in this way, the CPU 105 in the memory unit 300 detects the coordinates of the vertexes A and B from the corresponding image data according to the program for detecting the dislocation in the ROM 115 (Step 302).

In order to obtain the coordinates of the vertexes A and B from the image data written in the memory 302, the following procedure has to be taken.

A page of image data is written into a given memory area in the image memory 302. This memory area is searched along the subscan direction in FIG. 11. A memory address of the vertex A is obtained when the first original image data is detected. Continuing the downward searching, the number of pixels having the image data of the original is counted. A memory address of the vertex B is obtained when the increase of the number of pixels changes to decrease (When the inclination of the original is contrary to the one shown in FIG. 11, the foregoing vertex A and vertex B are switched.)

When the addresses of the vertexes A and B on the memory is detected, the coordinates of the vertexes A and B can be readily detected in the X-Y coordinate system. In other words, as the image data is written by the unit of pixel in the image memory 302, the length in the main scan direction (X-direction) can be calculated from the address number in the X-direction according to the value obtained by dividing the width of the sensor of the CCD sensor 39 by the number of the unit sensors. On the other hand, the length in the subscan direction (Y-direction) can be obtained from the address number in the Y-direction and distance between the neighboring pixels, the distance being obtained from moving speed of the scanner 33 and interval of generation of the clock pulses for reading the pixels.

When the coordinates of the vertex A (xa, ya) and the vertex B (xb, yb) are obtained, θ° which is the degree of inclination of the original and the dislocation in the X-direction and Y-direction can be obtained.

The θ° can be obtained from the following well-known formula.

$$\theta = \tan^{-1}\left(\frac{yb - ya}{xb - xa}\right) \quad \text{(Formula 1)}$$

As can be readily understood from FIG. 11, by rotating the auto document feeder 10 around the point "O" by θ°, the original can be conveyed to the position shown by the rectangle A'B'C'D'. Therefore, by obtaining the coordinates of the vertex A' after rotating the vertex A by 0° around the "O" and then moving the vertex A'to the point Op as the arrow shows in the figure, it is possible to convey the original to the standard original reading position.

The coordinates of the vertex A' can be obtained from the following well-known formula.

$$\begin{pmatrix} xa' \\ ya' \end{pmatrix} = \begin{pmatrix} \cos\theta & -\sin\theta \\ \sin\theta & \cos\theta \end{pmatrix} \begin{pmatrix} xa \\ ya \end{pmatrix} \quad \text{(Formula 2)}$$

From this formula, (xa', ya'), the coordinates of the vertex A', can be obtained. By moving the coordinates to (xa'-xp) in the main scan direction and to (ya'-yp) in the subscan direction, the original can be conveyed to the standard original reading position, thereby eliminating the dislocation of the original.

However, it is very likely that the foregoing θ°, dislocation in the main scan direction and the subscan direction cannot be detected accurately only by a single adjustment. Therefore, as will be explained later in the present embodiment, the dislocation is adjusted after conveying a plurality of originals and obtaining average dislocations from each conveying.

As the dislocation in the main scan direction can be eliminated by moving the document guide 22 as the arrow shows on the document feed tray 11 in FIG. 4 and the dislocation in the subscan direction can be eliminated by adjusting the original-conveying distance of the auto document feeder 10, hereinafter, the dislocation in the main scan direction will be expressed as a document-feed-tray adjustment amount and the dislocation in the subscan direction will be expressed as the original-conveying adjustment amount.

The dislocation obtained in Step 303, specifically, θ° which is the inclination of the original, (ya'-yp) which is the original-conveying distance, and (xa'-xp) which is the document-feed-tray adjustment amount are sent to the CPU 107 as the ADF adjustment amount (Step 304), and the sub-routine returns to the main routine.

As is already mentioned, as the ADF adjustment amount is calculated according to the memory area of the image data of the original, the color of the original used in the ADF adjustment mode should be selected carefully so that it is possible to definitely determine whether the obtained image data is the image data of the original or the carrying belt. As it is very likely that the color of the carrying belt is white or yellow, solid dark color should be used for the original for the ADF adjustment.

Figure 12:
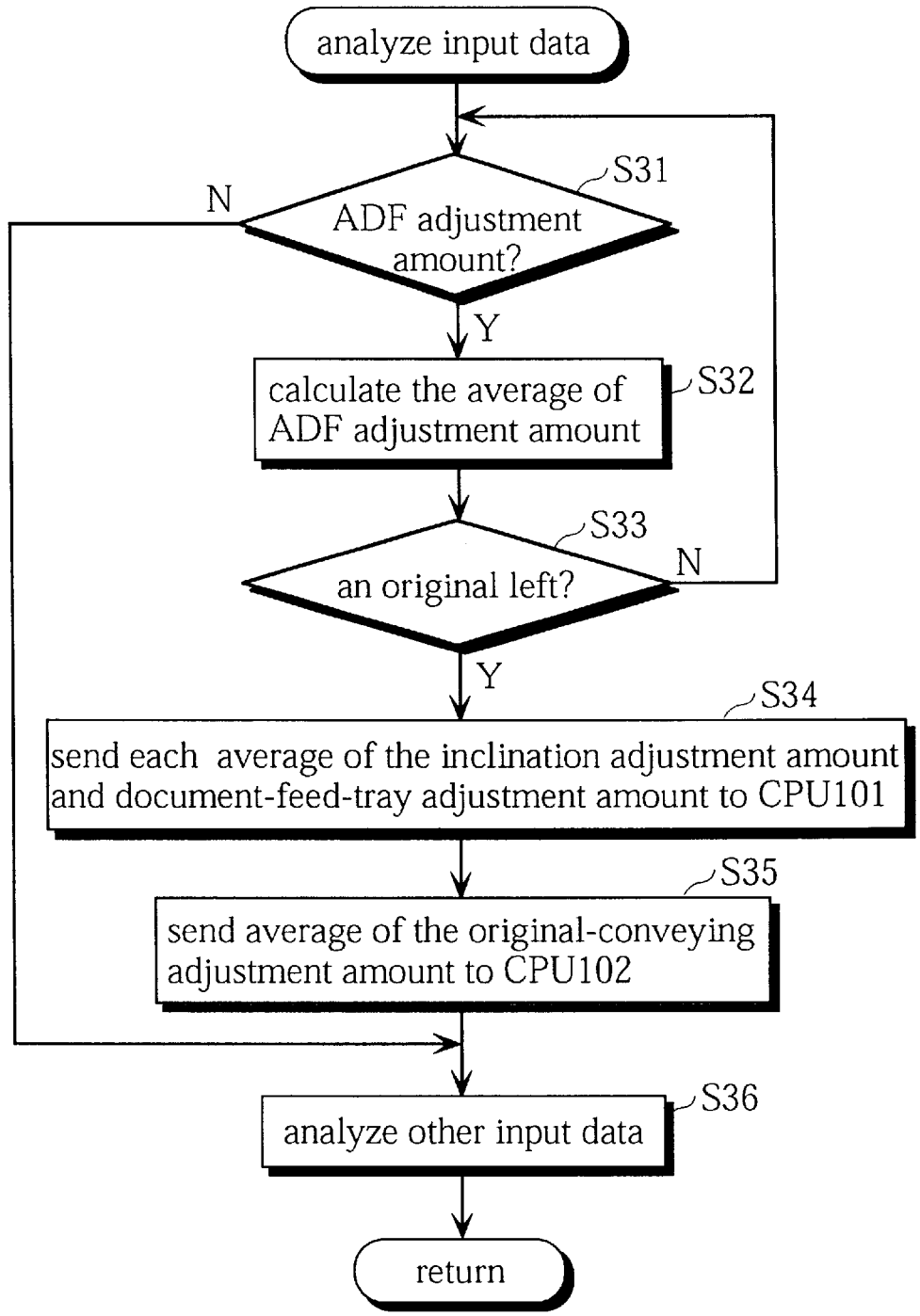
FIG. 12 is a flowchart showing a sub-routine of sending average of the ADF adjustment amount data inputted into CPU 107 in the control unit to each CPU.

FIG. 12 is a flowchart showing a sub-routine for analysis of the data inputted into the CPU 107.

First, the CPU 107 determines whether the inputted data is the ADF adjustment amount (Step 31). If that is not the case, the CPU 107 goes to Step 36 and analyzes other input data. If that is the case, the CPU 107 adds the current amount to the average of the ADF adjustment amount which has been calculated until that time, and further calculates new average (Step 32).

This calculation is repeated until no originals to be detected by the detection sensor SE1 are left (Step 33). At that time, each average of ADF adjustment amount is set as output data. First, the average of the inclination adjustment amount and the average of the document-feed-tray adjustment amount are sent to the CPU 101 (Step 34). On the other hand, the original-conveying distance is sent to the CPU 102 (Step 35), and analysis of other input data is implemented (Step 36).

As the CPU 107 obtains the average of each ADF adjustment amount obtained by reading a plurality of originals, and treats the average as the final adjustment amount, more accurate ADF adjustment amount can be obtained.

Figure 13:
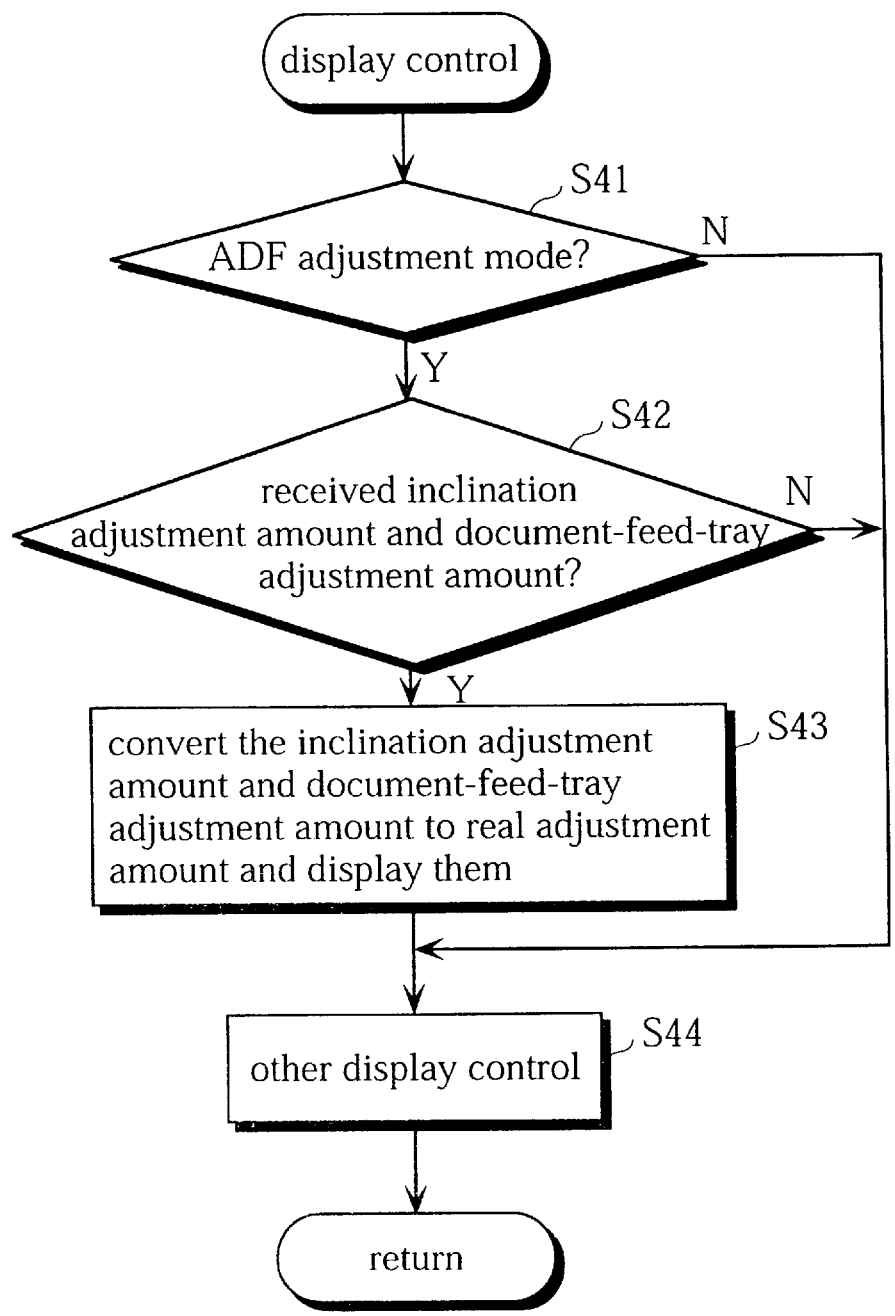
FIG. 13 is a flowchart showing a sub-routine for controlling display of the operation panel when the ADF adjustment mode is set in the CPU 101 in the control unit.

FIG. 13 is a flowchart showing a sub-routine of the display control of the operation panel 90 in the CPU 101 when the ADF adjustment mode is set.

When the ADF adjustment mode is set on receiving the operation of the ADF adjustment mode key 97 (Step 41), the CPU 101 notifies it to the CPU 107 and lights the ADF adjustment mode display LED 98. At this time, the CPU 101 confirms the existence of the original by the original detection sensor SE1. When the original is not detected, the CPU 101 displays a message on the liquid crystal touch panel 91, telling that the original should be placed on the paper tray 11, thereby making it easy to operate the copying machine.

When the operator recognizes that the original is placed on the document feed tray 11 and presses the start key 96, the CPU 105 detects the inclination adjustment amount and the document-feed-tray adjustment amount as is already mentioned. The CPU 101 receives the adjustment amount, converts them into the real adjustment amount, and displays them on the liquid crystal touch panel 91 (Steps 42 and 43).

The reason of this conversion can be explained as follows: as the adjustment amounts obtained in the CPU 105 are values obtained in the X-Y coordinates, it is more convenient to convert them into values which can be readily adjusted by the operator. In the present embodiment, the scale 502b (FIG. 3B) for adjusting the degrees for attaching the auto document feeder 10 and the scale 22c (FIG. 4) for adjusting the position of the document feed tray in the main scan direction are provided. According to the conversion coefficient set in the ROM 111 beforehand, the CPU 101 converts the ADF adjustment amount to the adjustment amount of the unit shown by the scale 502b and the 22c and displays them. In this way, the operator can readily adjust the foregoing two dislocations of the position of the original. After displaying the ADF adjustment amount in the above mentioned way, the ADF adjustment mode is automatically cancelled. The CPU 101 puts out the light of the ADF adjustment mode display LED 98, and carries out other display control (Step 44).

Figure 14:
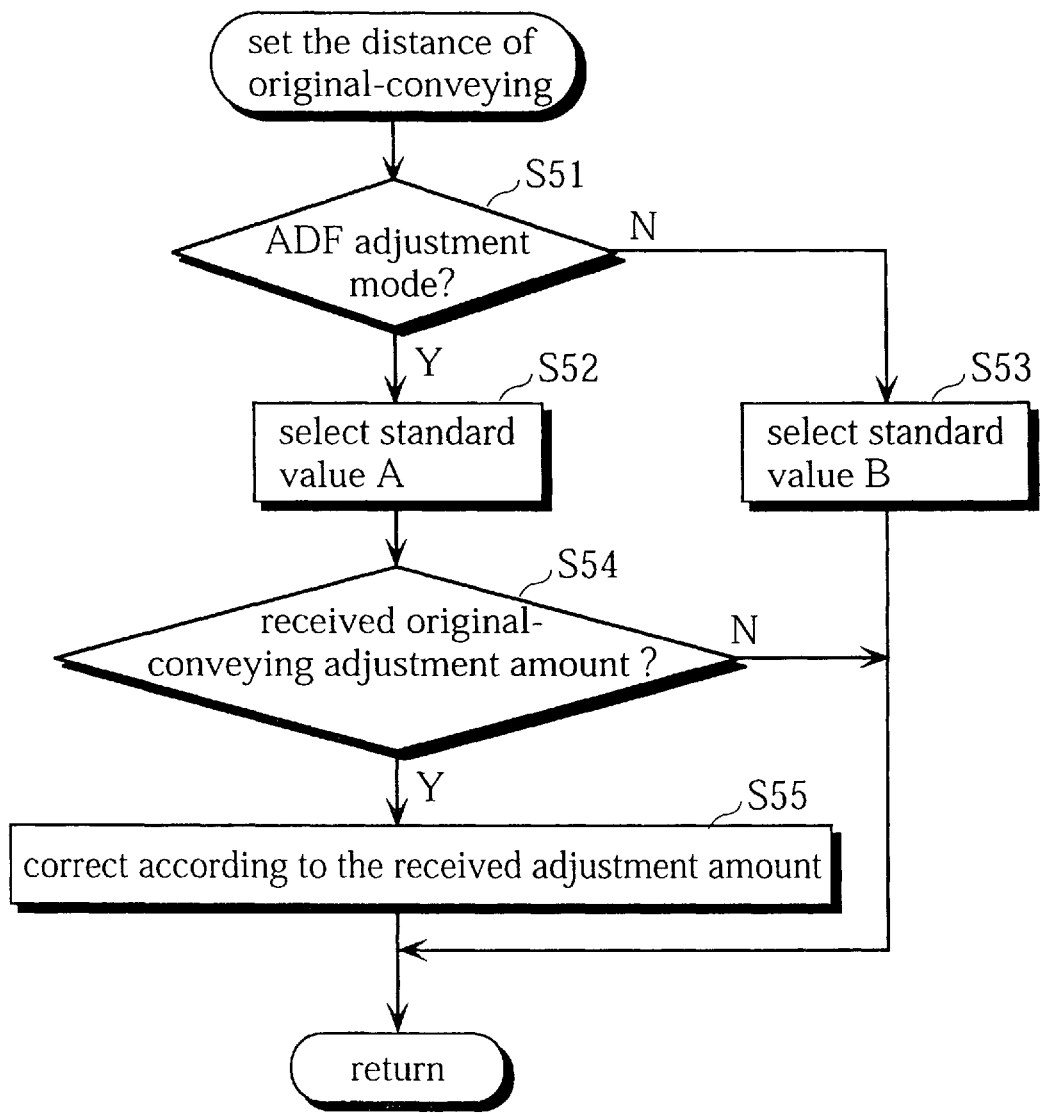
FIG. 14 is a flowchart showing a sub-routine for correcting the original-conveying distance when the ADF adjustment mode is set in the CPU 102 in the control unit.

FIG. 14 is a flowchart showing a sub-routine when the distance of conveying the original of the auto document feeder 10 is set by the CPU 102.

First, the CPU 102 judges whether the ADF adjustment mode is set. If that is the case, the CPU 102 selects a standard value A as the original-conveying distance (Steps 51 and 52). If that is not the case, the CPU 102 selects a standard value B as the original-conveying distance (Steps 51 and 53). Here, the standard values A and B are expressed by parameters (the foregoing count number) for controlling the original-conveying distance by the CPU 102. The standard value A is set at a certain value so that the original is conveyed to the side of the platen glass 31 in the subscan direction from the standard reading position, preventing a part of the original from extending off the platen glass 31 in the subscan direction in the ADF adjustment mode. By conveying the original, while making the position of the document guide 22 being at the lowest possible position in FIG. 4, the entire original can be conveyed across the platen glass 31 without fail. Therefore, whole image data of the original can be obtained, so that the ADF adjustment amount can be calculated accurately.

The standard value B is the value which has already been calculated so that the original is aligned with the standard original reading position by the foregoing adjustment.

In Step 54, on receiving the output data of original-conveying adjustment amount from the CPU 107, the CPU 102 corrects the standard value A according to the data (Step 55), and after that, the corrected value is treated as the standard value B. The original-conveying distance is controlled by using the standard value B. At this time, it is necessary to convert the original-conveying distance into the adjustment amount of the count number. In order to do so, the ROM 112 stores a conversion coefficient set beforehand. The CPU 102 obtains the adjustment amount of the count number from the conversion coefficient and stores it into the RAM 122 as the standard value B. After that, the CPU 102 controls the original-conveying distance according to the standard value B.

So far, the explanation has been given for the adjustment of the original-conveying distance in the case of copying the front of the original. However, it is also possible to adjust the original-conveying distance in order to copy the back of the original by reversing the original with the reversing roller 21. In other words, as the relation of position between the original edge detection sensors SE2 and SE3 are constant, there is a certain correlation between the first count number for reading the back of the original after the rear edge of the original is detected by the original edge detection sensor SE2 and the second count number for copying the back of the original after the edge of the original is detected by the original edge detection sensor SE3. Therefore, by decreasing the first count number by N while increasing the second count number by N, the back of the original can be in alignment with the standard original reading position on the platen glass 31.

It is apparent that other embodiments and modification of the invention are possible as the following examples show.

According to the above-mentioned embodiment, the adjustment amount in the subscan direction obtained from the dislocation detection is sent to the CPU 102, thereby allowing automatic adjustment. However, it is also possible to input data of the original-conveying adjustment amount into the CPU 101, convert it into a parameter number (count number) for the CPU 102, and display the parameter number on the liquid crystal touch panel 91, thereby allowing the operator to correct the parameter number by the operation panel 90.

According to the above-mentioned embodiment, the original was read on condition that the top left corner of the platen glass 31 is the standard original reading position. If the center line of the original is set to the standard original reading position which is almost the center of the platen glass 31 in the main scan direction, the method of calculating the document-feed-tray adjustment amount is a little different.

Figure 15:
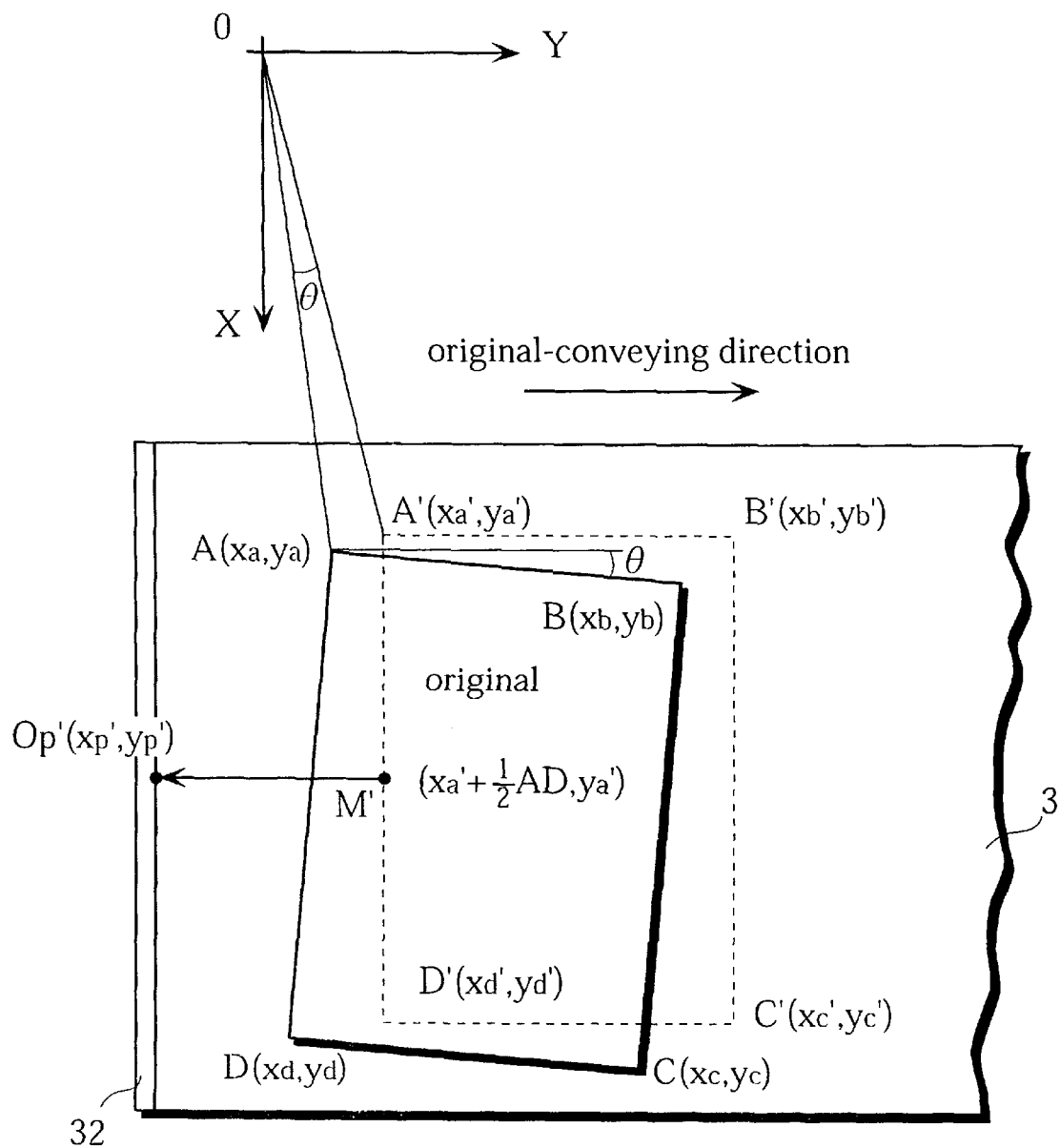
FIG. 15 shows the dislocation amount when the standard original reading position is determined by setting the center line of the original to the center line of the platen glass in the main scan direction.

FIG. 15 is a figure showing a case of the above mentioned standard original reading position. In this figure, the original is conveyed to the position shown by the solid lines by the auto document feeder 10.

What is different from the foregoing FIG. 11 is that the standard point which determines the standard original reading position is Op'(xp', yp'), which is the center of the left edge of the platen glass 31 in the main scan direction.

Figure 16:
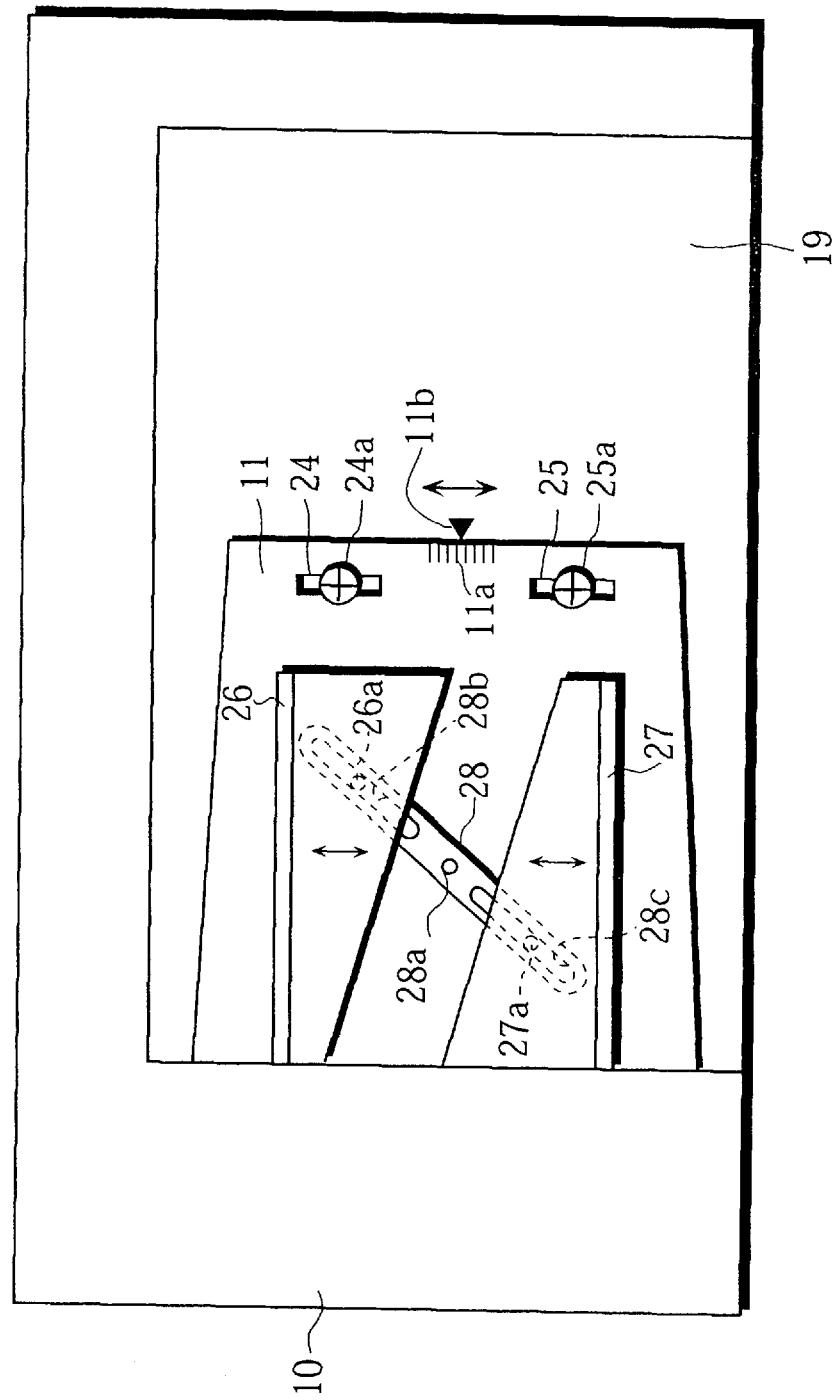
FIG. 16 shows construction of a document feed tray used in FIG. 15.

FIG. 16 shows construction of the document feed tray 11 of the auto document feeder 10 set to the copying machine having the above mentioned standard original reading position. The document feed tray 11 is fixed on the top surface of the auto document feeder 10 with bolts 24*a* and 25*a* via long holes 24 and 25, respectively. By loosening the bolts 24*a* and 25*a*, the entire document feed tray 11 can move in the direction of the main scan direction.

The document guides 26 and 27 are slidable on the document feed tray 11 as the arrows show in FIG. 16, and are connected by a crank 28 on their bottom side. The crank 28 can swing on the document feed tray 11, with a supporting axis 28*a* being the center. Protrusions 26*a* and 27*a* on the bottom side of the document guides 26 and 27, respectively, engage into the long holes 28*b* and 28*c* of the crank 28, which are symmetric with respect to the supporting axis 28*a*. Therefore, as one of the guides moves, the other guide moves into the opposite direction by the same distance. The center line of the original set on the document feed tray 11 is fixed.

Therefore, once the position of the document feed tray 11 is adjusted, whatever the size the original may be, the center line of the original can be adjusted to the standard point Op' in FIG. 15. By the scale 11*b* on the document feed tray 11 and the arrow pointer 11*b* on the top of the auto document feeder 10, the adjustment amount of the document feed tray 11 can be confirmed.

In FIG. 15, $\theta°$ which is the inclination of the original can be obtained from the formula (1), using the coordinates of the vertex A and the coordinates of vertex B. Therefore, the coordinates (xa', ya') that are after the correction of the inclination of the original can also be obtained from the formula (2). Assuming the length of a side AD of the original to be "L", the coordinates of the middle point M' of the side A'D' after the correction of the inclination are (xa'+L/a, ya'). Therefore, the dislocations between the standard point Op' (xp', yp') and this middle point M' are (ya'−yp') in the subscan direction and ((xa'+L/2)−xp') in the main scan direction. If the original size for the ADF adjustment and the original direction are fixed, the value of "L" can be stored in the ROM 115 beforehand. It is also possible to set an original size detection sensor in the document feed tray 11 and determine the length of the side from the original size detected by this sensor.

The dislocation in the subscan direction (original-conveying adjustment amount) is sent to the CPU 102, and the original-conveying distance is automatically adjusted. The dislocation in the main scan direction (document-feed-tray adjustment amount) is converted into a real adjustment amount and displayed on the operation panel 90. Seeing this display, the operator makes an adjustment by displacing the document feed tray 11 upward in FIG. 16 by the displayed adjustment amount using the scale 11*a*.

In the calculation processing of the ADF adjustment amount in FIG. 10, the entire original is on the platen glass 31. When a part of the original extends off the platen glass 31, the foregoing calculation method cannot be employed anymore. Therefore, it is explained for the sub-routine in FIG. 14 that the standard value A is set so that a part of the original will not extend off the platen glass 31 when the ADF adjustment mode is set. However, the ADF adjustment amount can be obtained even if the part of the original extends off the platen glass 31.

For example, when the vertexes A and B extend off the platen glass 31 in the upward direction in the figure, the adjustment amount can be obtained as follows.

The original size detection sensor is set to the document feed tray 11. In the same way mentioned above, from the image data of the original, inclination of the side CD is obtained from the coordinates of the vertex C and the coordinates of the vertex D. (At this time, it is also likely that the vertex D also extends off the platen glass 31. In such a case, any point on the side CD can substitute for the vertex D.) After the inclination is corrected, coordinates (xc', yc') of the vertex C' are obtained.

As the length and width of the original can be obtained by detecting the standard original size, coordinates of A' can be readily obtained by subtracting the length and width from the coordinates of C'. In this way, the ADF adjustment amount can be obtained. To sum up, the adjustment amount can be calculated when the original size, coordinates of one of the vertexes, and inclination of one of the sides have been determined. What has been explained in the above-mentioned embodiment is only an example.

By designating the original size and the original direction for the ADF is adjustment and storing its length and width in the ROM 115, there is no need to set the foregoing original size detection sensor on the document feed tray 11.

In the above-mentioned embodiment, the adjustment amount in the main scan direction and subscan direction was calculated by obtaining the $\theta°$ and predicting the case that this inclination is corrected. However, the following method is also possible. The ADF adjustment is divided into two steps: the first step is the adjustment of the inclination; and the second step is adjustment in the main scan and subscan directions. First, $\theta°$ is obtained and then displayed on the operation panel. The operator adjusts the attachment direction of the auto document feeder so that the original is conveyed in the subscan direction without any inclination. After that, the original is read again. From the original image data, the adjustment amount in the main scan direction and the subscan direction can be detected. In this case, the dislocation in the main scan direction (document-feed-tray adjustment amount) and the dislocation in the subscan direction (original-conveying adjustment amount) can be obtained directly from the coordinates of the vertex A of the detected original, without using the formula (2).

In the above-mentioned embodiment, the dislocation amount is calculated by assuming X-Y coordinates, and is converted to the real adjustment amount and displayed on the operation panel so that the operator can readily adjust the dislocation. However, by adjusting the unit in the X-Y coordinate axes, the dislocation amount may be used as the real adjustment amount as it is. In this case, the foregoing conversion is not needed at all.

Moreover, the scale 502b (FIG. 3B) and the scales 22c and 11a of the document feed tray (FIGS. 4 and 16) are not necessarily requisites. It is also possible to make an adjustment by using a measure, referring to the adjustment amount displayed on the operation panel.

The above-mentioned copying machine is the type in which the original set on the platen glass 31 and read by the moving scanner. The dislocation amount can be calculated in the same way in the case of the sheet through type of copying machine in which an image is read by a scanner fixed to the image reading unit while the original passes above the scanner at a constant speed V. In this case, the ADF adjustment amount can be determined in the same way mentioned above according to the following conditions: it is regarded that the original is located at the standard original reading position when the foreword edge of the original reaches to the position of the scanner at the time the scanner starts reading the original; and "y" which is the coordinate in the Y-direction is calculated by the formula "y=Vt", "t" being elapsed time from the time the standard signal of the timer in the CPU 102 is generated.

In this case, by delaying the timing of the generation of the foregoing standard signal by $\Delta t=\Delta y/V$ on condition that the dislocation amount in the Y-direction being $\Delta y$, the dislocation can be eliminated.

In the above-mentioned embodiment, the dislocation in the main scan direction was corrected by adjusting the position of the document feed tray. However, it is also possible to make the same correction by moving the entire auto document feeder in the main scan direction. In this case, for example, the auto document feeder is attached to the copying machine slidably in the main scan direction, and a fixing position should be able to be adjusted by a bolt.

In the above-mentioned, the image reading apparatus of the present invention was applied to the copying machine. However, the present invention can also be applied to all machines that have the image reading apparatus having the auto document feeder, such as facsimile.

Although the present invention has been fully described by way of examples with reference to the accompanying drawings, it is not be noted that various changes and modifications will be apparent to those skilled in the art. Therefore, unless such changes and modifications depart from the scope of the present invention, they should be construed as being included therein.

What is claimed is:

1. An image reading apparatus comprising:
    an image reading unit for reading the image of an original placed in an original reading area to generate image data;
    an original conveying unit for conveying an original to said original reading area of said image reading unit in a sub-scan direction;
    an original position detecting unit for detecting the position of an original conveyed to said original reading area by said original conveying unit;
    an operation unit for calculating a dislocation amount between said detected original position and a standard original reading position in said original reading area;
    a dislocation display unit for displaying an operation result of said operation unit; and
    an adjustment device for changing the position of said original in response to said dislocation amount.

2. An image reading apparatus according to claim 1, wherein
    said original position detecting unit detects the position of an original by searching through said image data obtained by said image reading unit.

3. An image reading apparatus according to claim 2, wherein
    said original position detecting unit detects the position of one side of an original, and
    said operation unit calculates said dislocation amount from the relationship between said detected side position and the position of a prescribed standard line specifying said standard original reading position.

4. An image reading apparatus according to claim 3, wherein
    at least the read surface of an original is painted in a color of low lightness.

5. An image reading apparatus according to claim 1, wherein the adjustment device includes
    an original conveying direction correction unit for correcting a deviation of an original conveying direction from said standard original reading position, in accordance with a prescribed correction value,
    wherein
        said operation unit calculates a deviation amount of a conveyed original from said standard original reading position, and
        said dislocation display unit displays said deviation amount converted into a correction value for the use of said original conveying direction correction unit.

6. An image reading apparatus according to claim 1, wherein the adjustment device includes
    a control unit for controlling an original conveying distance of said original conveying unit in accordance with a given parameter,
    wherein
        said operation unit calculates a dislocation amount between an original being conveyed and said standard original reading position in said sub-scan direction, and
        said dislocation display unit displays said dislocation amount converted into a correction value according to said parameter.

7. An image reading apparatus according to claim 6, wherein the adjustment device includes
    an original conveying direction correction unit for correcting a deviation of an original conveying direction from said standard original reading position,
    wherein
        said operation unit estimates an original conveying position, assuming that said original conveying direction is corrected by said original conveying direction correction unit, and determining a dislocation amount in said sub-scan direction in accordance with said estimated original conveying position, and
        said dislocation display unit displays said dislocation amount converted into a correction value for the use of said original conveying direction correction unit.

8. An image reading apparatus according to claim 1, wherein the adjustment device includes
    a main-scan direction correction unit for correcting the position of an original in a main-scan direction,
    wherein
        said operation unit calculates a dislocation amount in said main-scan direction between a original being conveyed and said standard original reading position, and said dislocation display unit displays said dislocation amount converted into a correction value for the use of said main-scan direction correction unit.

9. An image reading apparatus according to claim 8, wherein the adjustment device includes an original conveying direction correction unit for correcting a deviation of an original conveying direction from said standard original reading position, wherein said operation unit estimates an original conveying position, assuming that said original conveying direction is corrected by said original conveying direction correction unit, and determining a dislocation amount in said main-scan direction in accordance with said estimated original conveying position, and said dislocation display unit displays said dislocation amount converted into a correction value for the use of said original conveying direction correction unit.

10. An image reading apparatus according to claim 1, further comprising a correction value setting mode receiving unit for receiving an instruction to set a correction value setting mode, wherein if said correction value setting mode has been set, said original position detecting unit detects the position of an original, said operation unit calculates a dislocation amount, and said dislocation display unit displays said dislocation amount.

11. An image reading apparatus according to claim 1, wherein said adjustment device changes the position of said original in at least the sub-scan direction when said original is conveyed.

12. An image reading apparatus according to claim 1, further comprising:

an input device which is manually actuated thereby enabling an auto document feeder adjustment mode, said dislocation display unit displays said dislocation amount when said auto document feeder adjustment mode is enabled.

13. An image reading apparatus according to claim 12, wherein said dislocation display unit displays said dislocation amount only when said auto document feeder adjustment mode is activated.

14. An image forming apparatus comprising:

an image reading unit for reading the image of an original placed in an original reading area to generate image data;

an original conveying unit for conveying an original to said original reading area of said image reading unit in a sub-scan direction;

an original position detecting unit for detecting the position of an original conveyed to said original reading area by said original conveying unit;

an operation unit for calculating a dislocation amount of an original in said sub-scan direction between said detected original position and a standard original reading position in said original reading area; and a control unit for controlling an original conveying distance of said original conveying unit so that said dislocation amount in said sub-scan direction can be eliminated.

15. An image reading apparatus according to claim 14, wherein said original position detecting unit detects the position of an original by searching through said image data obtained by said image reading unit.

16. An image forming apparatus comprising:

an image reading unit reading the image of an original placed in an original reading area by a photoelectric conversion element to generate image data;

an original conveying unit for conveying an original to said original reading area of said image reading unit in a sub-scan direction;

an original position detecting unit for detecting the position of an original conveyed to said reading area by said original conveying unit;

an operation unit for calculating a dislocation amount between said detected original position and a standard original reading position in said original reading area;

a dislocation display unit for displaying said dislocation amount;

a printer for forming an image on a sheet in accordance with said image data, and an adjustment device for changing the position of said original in response to said dislocation amount.

17. An image reading apparatus according to claim 16, wherein said original position detecting unit detects the position of an original by searching through said image data obtained by said image reading unit.

18. An image forming apparatus according to claim 16, wherein the adjustment device includes an original conveying direction correction unit for correcting a deviation of an original conveying direction from said standard original reading position, in accordance with a prescribed correction value, wherein said operation unit calculates a deviation amount of a conveyed original from said standard original reading position, and said dislocation display unit displays said deviation amount converted into a correction value for the use of said original conveying direction correction unit.

19. An image forming apparatus according to claim 16, wherein the adjustment device includes a control unit for controlling an original conveying distance of said original conveying unit in accordance with a given parameter, wherein said operation unit calculates a dislocation amount between an original being conveyed and said standard original reading position in said sub-scan direction, and said dislocation display unit displays said dislocation amount converted into a correction value according to said parameter.

20. An image forming apparatus according to claim 16, wherein the adjustment device further includes an original conveying direction correction unit for correcting a deviation of an original conveying direction from said standard original reading position, wherein said operation unit estimates an original conveying position, assuming that said original conveying direction is corrected by said original conveying direction correction unit, and determining a dislocation amount in said sub-scan direction in accordance with said estimated original conveying position, and said dislocation display unit displays said dislocation amount converted into a correction value for the use of said original conveying direction correction unit.

21. An image forming apparatus according to claim 16, wherein the adjustment device includes a main-scan direction correction unit for correcting the position of an original in a main-scan direction, wherein said operation unit calculates a dislocation amount in said main-scan direction between a original being conveyed and said standard original reading position, and said dislocation display unit displays said dislocation amount converted into a correction value for the use of said main-scan direction correction unit.

22. An image forming apparatus according to claim 21, wherein the adjustment device includes an original conveying direction correction unit for correcting a deviation of an original conveying direction from said standard original reading position, wherein said operation unit estimates an original conveying position, assuming that said original conveying direction is corrected by said original conveying direction correction unit, and determining a dislocation amount in said main-scan direction in accordance with said estimated original conveying position, and said dislocation display unit displays said dislocation amount converted into a correction value for the use of said original conveying direction correction unit.

23. An image forming apparatus according to claim 16, wherein said adjustment device changes the position of said original in at least the sub-scan direction when said original is conveyed.

24. An image forming apparatus according to claim 16, further comprising:

an input device which is manually actuated thereby enabling an auto document feeder adjustment mode, said dislocation display unit displays said dislocation amount when said auto document feeder adjustment mode is enabled.

25. An image forming apparatus according to claim 24, wherein said dislocation display unit displays said dislocation amount only when said auto document feeder adjustment mode is activated.

26. An image forming apparatus comprising:

an image reading unit for reading the image of an original placed in an original reading area by a photoelectric conversion element to generate image data;

an original conveying unit for conveying an original to said original reading area of said image reading unit in a sub-scan direction;

an original position detecting unit for detecting the position of an original conveyed to said original reading area by said original conveying unit;

an operation unit for calculating a dislocation amount of an original in said sub-scan direction from said detected original position and a standard original reading position in said original reading area;

a control unit for controlling an original conveying distance of said original conveying unit in accordance with said dislocation amount, so that dislocations in said sub-scan direction can be avoided; and a printer for forming an image on a sheet in accordance with said image data.

27. An image forming apparatus according to claim 26, wherein said original position detecting unit detects the position of an original by searching through said image data obtained by said image reading unit.

28. A method of correcting an original conveying position using an original conveying unit attached to an image reading unit, comprising the steps of:

(1) detecting the position of an original conveyed to an original reading area by said original conveying unit and a dislocation amount from a standard original reading position of said image reading unit, in accordance with image data obtained by said image reading unit, (2) displaying said dislocation amount on a display unit, and (3) manipulating an adjustment device in response to the dislocation amount.

29. A method of correcting an original conveying position according to claim 28, wherein the step of manipulating said adjustment device includes changing the position of said original in at least a sub-scan direction when said original is conveyed.

30. A method of correcting an original conveying position according to claim 28, wherein step (2) further comprises manually activating an input device to enable an auto document feeder adjustment mode, said dislocation amount being displayed in response to the activation of said input device.

31. A method of correcting an original conveying position according to claim 30, wherein said dislocation amount is displayed only in response to the activation of said input device.

32. A method of correcting an original conveying position using an original conveying unit attached to an image reading unit, comprising the steps of:

(1) detecting the position of an original conveyed to an original reading area by said original conveying unit and a dislocation amount in a sub-scan direction from a standard original reading position of said image reading unit, in accordance with image data obtained by said image reading unit, and (2) adjusting an original conveying distance of said original conveying unit in accordance with said dislocation amount, so that dislocations in said sub-scan direction can be avoided.

* * * * *